US011949798B2

(12) United States Patent
Nix

(10) Patent No.: US 11,949,798 B2
(45) Date of Patent: *Apr. 2, 2024

(54) SECURE CONFIGURATION OF A SECONDARY PLATFORM BUNDLE WITHIN A PRIMARY PLATFORM

(71) Applicant: John A. Nix, Evanston, IL (US)

(72) Inventor: John A. Nix, Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,505

(22) Filed: Apr. 17, 2023

(65) Prior Publication Data

US 2023/0254163 A1      Aug. 10, 2023

Related U.S. Application Data

(63) Continuation of application No. 17/077,483, filed on Oct. 22, 2020, now Pat. No. 11,671,265.

(Continued)

(51) Int. Cl.
*H04L 9/32* (2006.01)
*G06F 7/58* (2006.01)
(Continued)

(52) U.S. Cl.
CPC .......... *H04L 9/3268* (2013.01); *G06F 7/588* (2013.01); *G06F 8/60* (2013.01); *G06F 15/7807* (2013.01);
(Continued)

(58) Field of Classification Search
CPC ... H04L 9/0816; H04L 9/0861; H04L 9/3247; H04L 9/3268; H04L 63/0823;
(Continued)

(56) References Cited

U.S. PATENT DOCUMENTS 6,009,177 A     12/1999  Sudia
10,380,362 B2   8/2019   Nix
(Continued)

FOREIGN PATENT DOCUMENTS

WO    WO2020226466    11/2020

OTHER PUBLICATIONS

Internet Engineering Task Force (IETF) Request for Comments (RFC) 768, "User Datagram Protocol", Aug. 1980.

(Continued)

*Primary Examiner* — Eric W Shepperd
(74) *Attorney, Agent, or Firm* — GrowIP Law Group LLC

(57) ABSTRACT

A primary platform (PP) can (i) support a first set of cryptographic parameters and (ii) securely download an unconfigured secondary platform bundle (SPB) that includes a configuration package (SPB CP). The SPB CP can establish a secure session with a configuration server (CS). The CS can select operating cryptographic parameters supported by the first set. The SPB CP can derive an SPB private and public key. The PP can use the selected operating cryptographic parameters to securely authenticate and sign the SPB public key. The CS can (i) verify the PP signature for the SPB public key and (ii) generate an SPB identity and certificate for the SPB and (iii) send the certificate and SPB configuration data to the SPB CP. The SPB CP can complete configuration of the SPB using the SPB identity, certificate, and configuration data. The configured SPB can authenticate with a network using the certificate.

20 Claims, 5 Drawing Sheets

Related U.S. Application Data

(60) Provisional application No. 62/925,812, filed on Oct. 25, 2019.

(51) Int. Cl.

| | | |
|---|---|---|
| *G06F 8/60* | (2018.01) | |
| *G06F 15/78* | (2006.01) | |
| *H04L 9/08* | (2006.01) | |
| *H04L 9/30* | (2006.01) | |
| *H04L 9/40* | (2022.01) | |
| *G06F 9/455* | (2018.01) | |
| *G06Q 20/38* | (2012.01) | |
| *G06Q 30/018* | (2023.01) | |

(52) U.S. Cl.
CPC .......... *H04L 9/0825* (2013.01); *H04L 9/0861* (2013.01); *H04L 9/0894* (2013.01); *H04L 9/3093* (2013.01); *H04L 9/3247* (2013.01); *H04L 9/3297* (2013.01); *H04L 63/166* (2013.01); *G06F 9/45533* (2013.01); *G06Q 20/382* (2013.01); *G06Q 30/0185* (2013.01)

(58) Field of Classification Search
CPC ....... H04L 63/126; G06F 21/33; G06F 21/44; G06F 21/445; G06F 21/602; G06F 8/60
See application file for complete search history.

(56) References Cited

U.S. PATENT DOCUMENTS

| | | | |
|---|---|---|---|
| 10,389,533 | B2 | 8/2019 | Le Saint et al. |
| 2002/0107804 | A1 | 8/2002 | Kravitz |
| 2006/0026422 | A1* | 2/2006 | Bade ................... H04L 9/0897 713/164 |
| 2012/0036245 | A1 | 2/2012 | Dare et al. |
| 2019/0140837 | A1 | 5/2019 | Cheng et al. |
| 2020/0084622 | A1 | 3/2020 | Yoon et al. |
| 2020/0092095 | A1 | 3/2020 | Yang et al. |
| 2020/0137572 | A1 | 4/2020 | Yoon et al. |
| 2020/0221294 | A1 | 7/2020 | Kang et al. |
| 2020/0351651 | A1 | 11/2020 | Koo et al. |
| 2021/0058774 | A1 | 2/2021 | Yang et al. |
| 2021/0120424 | A1 | 4/2021 | Kang et al. |
| 2021/0126801 | A1 | 4/2021 | Nix |
| 2022/0053029 | A1 | 2/2022 | Koo et al. |

OTHER PUBLICATIONS

Internet Engineering Task Force (IETF) Request for Comments (RFC) 793, "Transmission Control Protocol", Sep. 1981.
GSM Association, SGP.02, "Remote Provisioning Architecture for Embedded UICC Technical Specification" v. 4.0, Feb. 2019.
GSM Association, SGP.22, "RSP Technical Specification" v. 2.2, Sep. 2017.
Wikipedia, "Post-Quantum Cryptography", Feb. 22, 2019.
Internet Engineering Task Force (IETF) Request for Comments (RFC) 8446, "The Transport Layer Security (TLS) Protocol Version 1.3", Aug. 2018.
Federal Information Processing Standards Publication (FIPS) 186-4, "Digital Signature Standard (DSS)", Jul. 2013.
Internet Engineering Task Force (IETF) Request for Comments (RFC) 6961, "The Transport Layer Security (TLS) Multiple Certificate Status Request Extension", Jun. 2013.
Internet Engineering Task Force (IETF) Request for Comments (RFC) 7542, "The Network Access Identifier", May 2015.
Wikipedia, "Post-Quantum Cryptography Standardization", Oct. 23, 2019.
GSM Association, "iUICC POC Group Primary Platform requirements", Release 1.0, May 17, 2017.
European Technical Standards Institute (ETSI), "Meeting #81 document SCP(17)000188", Dec. 5, 2017.
Wikipedia, "Elliptic Curve Diffie-Hellman", Mar. 9, 2018.
National Institute of Standards and Technology (NIST) document "NIST SP 800-56A, Recommendation for Pair-Wise Key Establishment Schemes Using Discrete Logarithm Cryptography", Mar. 2007.
GlobalPlatform, "Open Firmware Loader for Tamper Resistant Element", Version 1.3, Jun. 2017.
ERSI TS 103 465 V15.0.0 Smart Cards; Smart Secure Platform (SSP); Requirements Specification [Online], May 2019 [Retrieved Aug. 1, 2022], www.etsi.org, Retrieved from (https://www.etsi.org/deliver/etsi_ts/103400_103499/103465/15.00.00_60/ts_103465v150000p.pdf), 2019.

\* cited by examiner

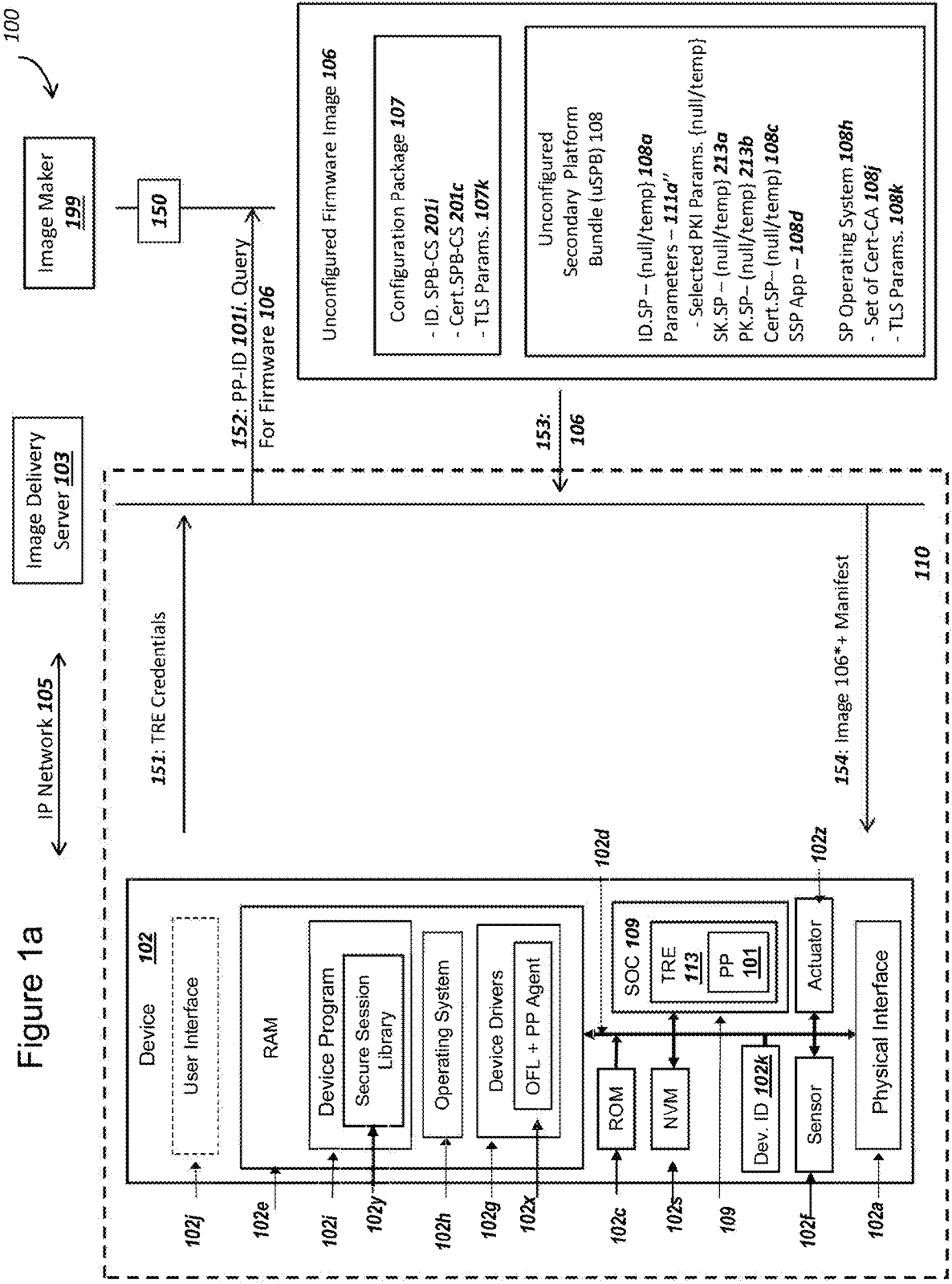

Figure 1c

Cryptographic Parameters 111

| Parameters 111a | PK Key Length 111b | Type 111c | Signature Algorithm 111d | Hash Algorithm 111e | Key Exchange 111f | Cert.TS-Auth 111g |
|---|---|---|---|---|---|---|
| 1 (In 101) | 348 | ECC-p384 | ECDSA | SHA3-256 | ECDH | 111g-1 |
| 2 | 256 | ECC-p256 | ECDSA | SHA-256 | ECDH | 111g-2 |
| 3 ⎫ | 384 | ECC-p384 | ECDSA | SHA3-384 | ECDH | 111g-3 |
| 4 ⎬ 111a''' | 3000 KB | Code (PQC) | GeMSS | SHA3-512 | ECDH  *111a'''-x* | 111g-4 |
| 5 ⎭ | 256 | ECC X25519 | ECDSA | SHA-256 | ECDH | 111g-5 |
| 6 | 3104 | Lattice (PQC) | qTesla-Speed | SHA2-512 | KEM-2 | 111g-6 |
| 7 (In 108) | 2048 | RSA | DSA | SHA-256 | RSA | 111g-7 |
| 8 | 3072 | RSA | DSA | SHA-256 | RSA | 111g-8 |
| 9 | 14880 | Lattice (PQC) | qTesla-p-3 | SHA3-512 | KEM-3  *210b* | 111g-9 |

(Example *111a'*) ↑
(Example *111a''*) ↑

| Parameters 111a | PK.PP 115b | Cert.PP 120 | Cert.Chain-CA.PP 131 | Cert-root.CA 133 | PK.SPB-CS 201ca | Cert.SPB-CS 201c | Cert.Chain-CA.SPB-CS 201d | Cert-root.CA 133 |
|---|---|---|---|---|---|---|---|---|
| 1 | 115b-1 | 120-1 | 131-1 | 133-1 | | | | |
| 2 | 115b-2 | 120-2 | 131-2 | 133-2 | | | | |
| 3 (In 101) | 115b-3 | 120-3 | 131-3 | 133-3 | 201ca-3 | 201c-3  *111a'''-x* | 201d-3 | 133-3 |
| 4 | 115b-4 | 120-4 | 131-4 | 133-4 | 201ca-4 | 201c-4 | 201d-4 | 133-4' |
| 5 | 115b-5 | 120-5 | 131-5 | 133-5 | 201ca-5 | 201c-5 | 201d-5 | 133-5' |
| 6 | | | | | 201ca-6 | 201c-6 | 201d-6 | 133-6 |
| 7 | | | | | 201ca-7 | 201c-7 | 201d-7 | 133-7 |
| 8 | | | | | 201ca-8 | 201c-8 | 201d-8 | 133-8 |
| 9 | | | | | 201ca-9 | 201c-9 (In 108) | 201d-9 | 133-9 |

(Example *111a''*) ←——→

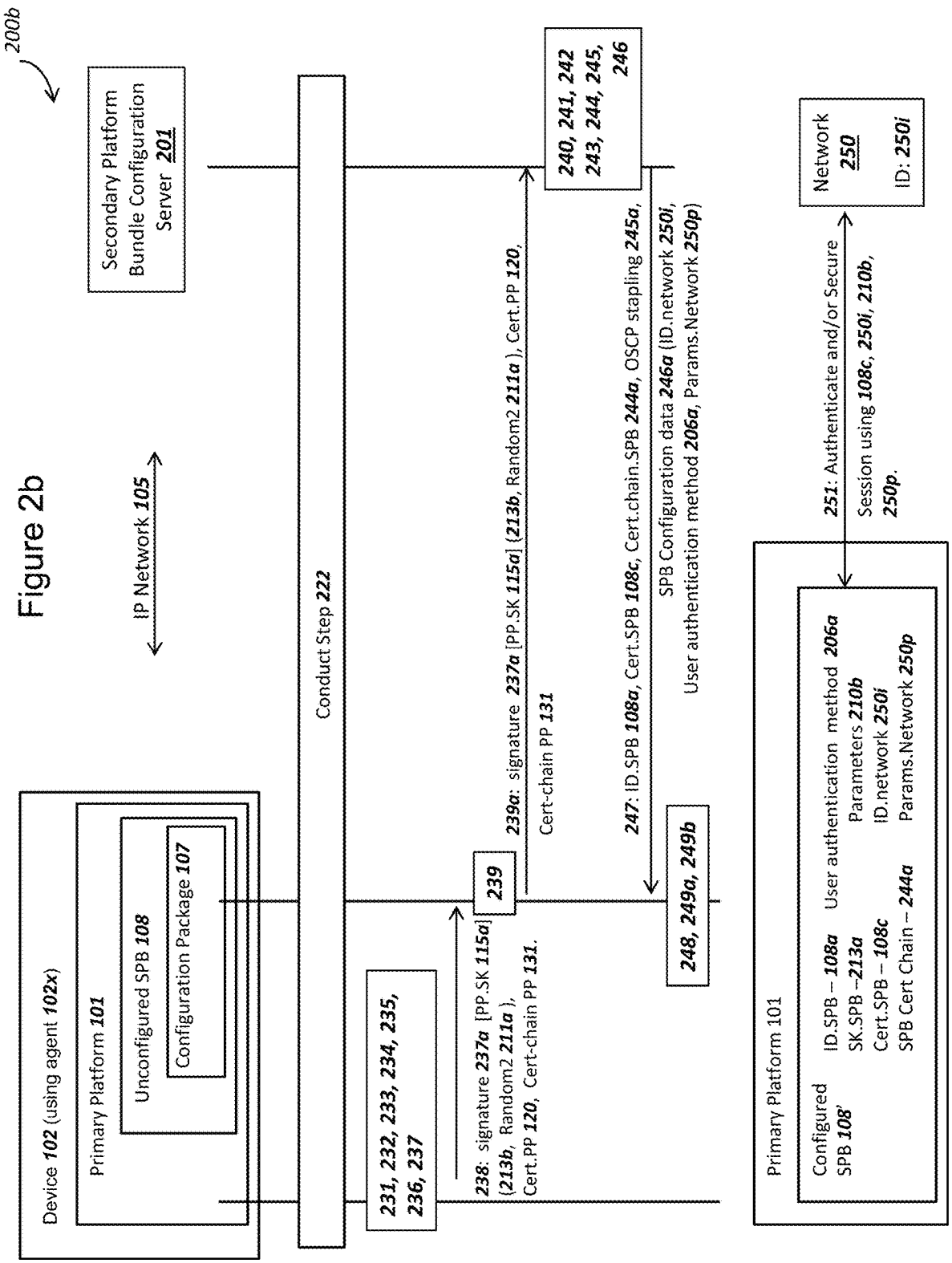

SECURE CONFIGURATION OF A SECONDARY PLATFORM BUNDLE WITHIN A PRIMARY PLATFORM

CROSS REFERENCE TO RELATED APPLICATIONS

The present application claims priority to U.S. Non-Provisional patent application Ser. No. 17/077,483 filed Oct. 22, 2020, which claims priority to U.S. Provisional Application No. 62/925,812 filed Oct. 25, 2019, both of which are herewith incorporated by reference into the present application.

BACKGROUND

Technical Field

The present systems and methods relate to securely configuring a secondary platform bundle for operation by a primary platform, and more particularly using a configuration server to convert an unconfigured secondary platform bundle to a configured secondary platform bundle, in order for the secondary platform bundle to securely communicate with a network.

Description of Related Art

The commercial development and deployment of secure processing environments within microprocessors and tamper resistant elements (TRE) can increase security of computing devices such as mobile phones and networked sensors for the "Internet of Things". A secure processing environment or TRE can enable a device to securely record cryptographic keys and conduct cryptographic operations such as key exchanges, key derivation, and also digital signatures in an a computing environment that is isolated from other electrical components within the device that may not be secure. Examples available today include an embedded subscriber identity module (embedded SIM), which is also known as an embedded universal integrated circuit card (eUICC), a traditional SIM card, a secure enclave within a "system on a chip", a trusted execution environment (TEE), and other examples are available as well. A common computing architecture includes a processor with multiple cores, where a secure processing core is isolated from the other cores, and the secure processing core can store and read cryptographic keys and conduct cryptographic operations. Other possibilities exist as well, including "switching" a generic processor between an insecure mode to a secure mode.

As the number of transistors and memory cells available for a given surface area of silicon continues to grow, the computational power for secure processing environments continues to increase. Some secure processing environments can operate as a host computing environment and provide the functionality of a virtual machine for different firmware images, such that each firmware image can operate as separate computing environments within the secure processing environment. As one example, secure processing environments can now enable a TRE to operate as a primary platform for hosting potentially a variety of different firmware images or secondary platform bundles, where each of the firmware images can support a different application. As another example, a secure processing environment could operate a Java™ virtual machine, and different firmware images could comprise different Java applets or Java-based applications. Each Java applet could comprise different images for the Java virtual machine. Other possibilities exist as well for a secure processing environment to operate as a primary platform for hosting images such as at least one secondary platform bundle, and the images may also be referred to as a firmware image.

A primary platform both (i) operating within a secure processing environment and (ii) using firmware images can support a variety of useful applications for a computing device. The operation of an example primary platform can perform functions outlined in the GSM Association (GSMA) technical document "iUICC POC Group Primary Platform requirements", Release 1.0 dated May 17, 2017, which is hereby incorporated by reference in its entirety ("GSMA PP Requirements"). Example applications supported by a primary platform using firmware images are identified in Section 3, "Use Cases" and include firmware for an embedded SIM, a traditional universal integrated circuit card (UICC), mobile payments, secure bootstrapping, digital rights management, user identification such as a drivers license, secure access to home automation, a virtual automobile key, and other applications are identified as well.

Further the European Telecommunications Standards Institute (ETSI) has begun developing standards for a "Smart Secure Platform" (SSP) as part of the development of 5G standards, and an SSP could operate as a primary platform as well. As of Oct. 25, 2019, the draft technical standards for an SSP are not published, but will likely support applications similar to those contemplated in the GSMA PP requirements document. However, ETSI has published the requirements for the SSP in the document ETSI TS 103 465 V15.0.0 (2019-05) titled "Smart Cards; Smart Secure Platform (SSP); Requirements Specification" ("ETSI SSP Requirements"), which is hereby incorporated by reference in its entirety. In summary, a primary platform operating within a secure element or tamper resistant element can support the download of firmware, where the firmware can include a secondary platform bundle. The secondary platform bundle can support multiple different use cases as outlined in section 6 of the ETSI SSP Requirements, which are also equivalent to the use cases above in the GSMA PP Requirements document. A need exists in the art for a primary platform to download a firmware image with an unconfigured secondary platform bundle, such that the secondary platform bundle can be securely configured. A need exists in the art for the unconfigured secondary platform bundle to internally derive public key infrastructure (PKI) key pairs for use by the secondary platform bundle in a secure and authenticated manner.

As the standards for operating a primary platform or a smart secure platform (SSP) continue to evolve, new features or the use of new cryptographic algorithms or steps may be introduced, such as support for post-quantum cryptography. As of October, 2019, global standards for widely used post-quantum cryptography algorithms are still under development. A need exists in the art for a primary platform deployed on devices with existing cryptographic algorithms such as elliptic curve cryptography to securely support a secondary platform bundle operating the post-quantum cryptography algorithms. Thus, new features and/or cryptographic steps or algorithms may require new firmware and secondary platform bundles for the primary platform in order to support new or updated versions of the standards. A need exists in the art for the secure configuration of the secondary platform bundles to support new cryptographic algorithms, where the primary platform may support older generations of cryptographic algorithms.

Secure operation of a primary platform or an SSP for each of the above standards for primary platforms depends on the secure configuration firmware from a server to the primary platform. Different secondary platform bundles may be required by a primary platform in order to support each of the above example applications or use cases. Further, over time new features may be added to the applications, which would also likely require the download and configuration of new secondary platform bundles. Note that the ETSI SSP Requirements document does not suggest how an unconfigured or generic secondary platform bundle can be securely configured, including the support of cryptographic algorithms for the secondary platform bundle which are not implemented by the primary platform. A need exists in the art for an image maker or source of a secondary platform bundle to create a generic or unconfigured secondary platform bundle, such that the (i) generic secondary platform bundle could be distributed to a plurality of different devices with primary platforms and (ii) the generic or unconfigured secondary platform bundle could be subsequently and securely configured for each different device with a primary platform in which the unconfigured secondary platform bundle operates. A need exists in the art for the generic or unconfigured secondary platform bundle to support a variety of different primary platforms, where different primary platforms could support different sets of cryptographic algorithms and cryptographic parameters.

Global Platform has released a standard for the secure download of firmware to a primary platform in the document "Open Firmware Loader for Tamper Resistant Element Version 1.3" ("GP OFL"), which is herein incorporated by reference in its entirety. This standard also does not suggest necessary and secure steps for the secure configuration of generic firmware or a secondary platform bundle after the firmware has been downloaded. Secure configuration including the authenticated generation of PKI keys and receipt of an identity by a generic secondary platform bundle is a significant technical challenge, since the computing device with the primary platform may include insecure components, such as a generic processor and a generic operating system. In addition, a different server or entity may be responsible for the configuration of the firmware than the server or entity downloading the image. A need exists in the art to securely support a first server and entity downloading an image for a primary platform and then a second server or entity securely configuring the downloaded image.

An insecure device can conduct many of the steps for communicating between (i) a server that configures the generic secondary platform bundle after download and (ii) the secondary platform bundle. As one example, the computing device could comprise a mobile phone or "smartphone" based on Android or IOS or similar operating systems and could also either (i) operate with "malware" that is unknown to a user or a network or (ii) could comprise a "rooted" mobile phone that is under the control of hackers. A need exists in the art for the secure and authenticated configuration of downloaded firmware for a primary platform, such that a secondary platform bundle can subsequently securely communicate with a network.

A primary platform operating in a tamper resistant element can be a resource constrained computing environment, compared to a traditional computing environment of a mobile phone or a personal computer. This resource constrained environment can create significant challenges for secure configuration of a firmware image. As one example, a primary platform may have no ability to keep track of current date and time when powered off. Time from the host device may not be trusted. A current and verified date/time value could be required in order to verify current certificate status for the numerous certificates to support configuration of downloaded firmware. The primary platform may not readily be able to (i) obtain and use the current certificate status such as Online Certificate Status Protocol (OCSP) stapling for a full chain of X. 509v3 certificates and also (ii) confirm the current validity status of a full chain of certificate authority certificates in order to fully validate a digital signature generated by the primary platform during configuration of the generic secondary platform bundle.

A need exists in the art for configuration server of unconfigured downloaded firmware to check certificate status for the full chain of certificates for a primary platform in order to fully authenticate a digital signature generated by the primary platform. A need exists in the art for the primary platform to securely obtain a timestamp in order for the primary platform to (i) verify a full chain of certificates including the validity date has not expired, and (ii) authenticate a digital signature from a configuration server. In addition, the proper and full implementation of certificate revocation lists may not be feasible for the primary platform, since the primary platform (i) cannot directly contact the repository of a certificate revocation list and (ii) depends on an insecure mobile phone or computing device to reach a certificate revocation list.

Although the GSMA PP Requirements, GP OFL, and ETSI SSP Requirements documents outline requirements and conventional technology for the use of a primary platform and firmware for images operating on the primary platform, the documents do not teach or suggest the secure generation of PKI keys and the selection of cryptographic parameters for firmware such as a secondary platform bundle after download. Further, there is no teaching for how a public key generated by the secondary platform bundle or downloaded firmware could be securely received by a configuration server. There is no suggestion for a configuration server to securely generate a certificate for a public key derived by the secondary platform bundle or downloaded firmware. A need exists in the art for a configuration server to securely generate a certificate with an identity for the secondary platform bundle, where the primary platform and the secondary platform may support a plurality of different cryptographic algorithms and parameters. A need exists in the art for a secondary platform bundle to achieve the security goals in the unique environment where a primary platform can be resource constrained and also operate within a potentially insecure device.

Many other examples exist as well for needs in the art for the secure configuration of a secondary platform bundle or downloaded firmware for a primary platform, and the above are examples are just a few and intended to be illustrative instead of limiting.

SUMMARY

Methods and systems are provided for the secure configuration of firmware downloaded by a primary platform. The primary platform (PP) can operate within a tamper resistant element (TRE) and comprise a secure processing environment operating within a computing device. The primary platform can comprise a secure enclave, a secure element, a trusted execution environment (TEE), or a "Smart Secure Platform" as specified by ETSI standards. The computing device can comprise a mobile phone, wireless device, personal computer, networked server, router, laptop, or a networked transducer for the "Internet of Things". The device can (i) include insecure components such as a general processor and a general operating system and (ii) communicate with the primary platform using a device driver such as a primary platform agent.

The device can connect with an internet protocol (IP) based network such as the public Internet in order to establish a secure session with a server. The server can comprise an image delivery server (IDS) and receive a ciphertext firmware from an image maker. The image delivery server can comprise a computer with a network interface to communicate with the device via the IP network. The device can be one of a plurality of different devices communicating with the image delivery server.

In exemplary embodiments an image maker can create a generic firmware image for operation on multiple different primary platforms, and the firmware image can comprise an unconfigured secondary platform bundle. The firmware image can support the primary platform operating with an application, such as, but not limited to, an eUICC, a "Smart Secure Platform", secure identification of the device using the primary platform, and other possibilities exist as well for supported applications. The image maker can create the firmware image for a plurality of different primary platforms operating in different devices. The firmware can comprise an unbound image or an unconfigured secondary platform bundle, which could be subsequently be configured by the primary platform communicating with a configuration server. The firmware image can also include a configuration program or configuration package for the initial configuration of the unconfigured secondary platform bundle, such that the unconfigured secondary platform bundle can be converted into a configured secondary platform bundle.

The unconfigured secondary platform bundle can include (i) a set of supported cryptographic parameters that specify the setting and values for use with cryptographic algorithms in an operating system of the secondary platform bundle and (ii) null or temporary values for a secondary platform bundle (SPB) identity, secret or private key, public key, certificate, and operating cryptographic parameters. The null or temporary values could comprise variables defined but initially without data. The configuration package can include an identity of the configuration server (such as, but not limited to a domain name), a certificate of the configuration server, and transport layer security (TLS) parameters to use in a secure session with the configuration server. The device with the primary platform can download the firmware image from an image delivery server and load the firmware image in the primary platform. The loaded firmware image within the primary platform can include the configuration package and the unconfigured secondary platform bundle.

The unconfigured secondary platform bundle (uSPB) or configuration package operating within the primary platform can establish a secure session with the configuration server using the identity of the configuration server, the certificate of the configuration server, and the TLS parameters. The uSPB can query the primary platform for (i) a first set of cryptographic parameters supported by the primary platform, (ii) a primary platform configuration dataset, and (iii) a first random number generated by the primary platform. The uSPB can support a second set of cryptographic parameters. The uSPB can determine a mutual subset of supported cryptographic parameters from the first and second sets of cryptographic parameters. The uSPB can send through the secure session a first message to the configuration server the primary platform configuration dataset, the mutually supported subset of cryptographic parameters, and the first random number.

The configuration server can receive and process the first message. The configuration server can select a set of operating cryptographic parameters, which can comprise a subset of the mutually supported cryptographic parameters. The configuration server can generate a second random number and also select a second subset of the second set of cryptographic parameters supported by the uSPB for the derivation of a PKI key pair by the uSPB. The configuration server can send the uSPB a second message through the secure session, where the second message can include the set of operating cryptographic parameters, the second random number, and the second subset of cryptographic parameters for the uSPB to use in generating a static PKI key pair for the uSPB. The uSPB can generate the static PKI key pair using the received second subset of cryptographic parameters and a hardware random number generator in the primary platform.

The uSPB can send the configuration server the derived public key for the uSPB in a third message through the secure session. The configuration server can generate a first digital signature over the first and second random numbers and the derived public key for the uSPB. The first digital signature can be generated using the selected operating cryptographic parameters and a private key for the configuration server, where the private key corresponds to a public key in a certificate for the configuration server. The configuration server can obtain a time value and a signed timestamp from a timestamp authority, where the signed timestamp can also be over the first random number generated by the primary platform and received in the first message. The configuration server can obtain current OCSP stapling for the full certificate chain between the configuration server certificate and a certificate authority root certificate. The certificate authority root certificate could be specified in the selected operating cryptographic parameters.

The configuration server can send the uSPB a fourth message, where the fourth message includes the first digital signature, the derived public key for the uSPB, the first and second random numbers, the configuration server certificate, the certificate chain for the configuration server certificate, the OCSP stapling, the time value, and the signed timestamp. The uSPB can receive the fourth message, optionally verify the data in the fourth message including all digital signatures received (e.g. in the first digital signature, all certificates, the signed timestamp, and also OCSP stapling). The uSPB can forward the data from the fourth message to the primary platform in a fifth message, where the fifth message also includes the selected operating set of cryptographic parameters (which could be received by the uSPB in the second message).

The primary platform can receive the fifth message. The primary platform can use the selected operating set of cryptographic parameters in the fifth message to verify all of the digital signatures received in the fifth message (e.g. the first digital signature, all certificates, the signed timestamp, and also OCSP stapling). The primary platform can generate a second digital signature over at least the second random number and the derived public key for the uSPB. The second digital signature can be generated using the selected operating cryptographic parameters and a private key for the primary platform, where the private key corresponds to a public key in a certificate for the primary platform.

The primary platform can send the uSPB a sixth message, where the sixth message includes the second digital signature, the certificate for the primary platform, and a certificate chain for the certificate of the primary platform. In exemplary embodiments, the primary platform does not send the certificate for the primary platform until after the primary platform successfully verifies the first digital signature over at least the first random number, in order to enhance and maintain security. The uSPB can forward the data received in the sixth message to the configuration server via the secure session in a seventh message. The configuration server can conduct a series of steps to process the seventh message. The configuration server can verify all digital signatures in the seventh message (e.g. the second digital signature over the derived public key for the uSPB and the second random number, the certificate of the primary platform, and the certificate chain for the certificate of the primary platform).

The configuration server can select an identity for the secondary platform bundle, which could comprise an international mobile subscriber identity (IMSI), a subscription permanent identifier (SUPI), or a network access identifier (NAI), and other possibilities exist as well for an identity to be used by the secondary platform bundle. The configuration server can generate a certificate for the secondary platform bundle, where the SPB certificate includes the derived public key for the uSPB, the second set of cryptographic parameters from the second message (which are the parameters for the derived public key) and the identity. The configuration server can generate the certificate using a certificate signing request to a certificate authority. The configuration server can also receive or obtain a certificate chain for the SPB certificate, possibly through a root certificate. The configuration server can query for and receive OCSP stapling for the certificate chain.

The configuration server can process a set of SPB configuration data for a configured SPB to utilize when connecting with a network. The SPB configuration data can include a network identity, network parameters, and a user authentication method. The user authentication method could be selected from the primary platform configuration dataset received in the first message. For some embodiments, the network parameters can include a key K for conducting an Authentication and Key Agreement (AKA) based authentication with a wireless network. The uSPB could include firmware for using the key K or network parameters when connecting with a network using the network identity, and the firmware could be included in the operating system for the secondary platform bundle.

The configuration server can send the uSPB an eighth message through the secure session, and the eighth message can include the identity for the secondary platform bundle, the certificate for the secondary platform bundle, the certificate chain for the certificate of the secondary platform bundle, the OCSP stapling for the certificate chain, and the set of SPB configuration data. The uSPB can receive the eighth message and process the data. The uSPB can replace the null or temporary values in the unconfigured secondary platform with (i) data received in the eighth message, and (ii) data previously processed by the uSPB, such as the derived private key for the SPB and the derived public key for the SPB. After completion of processing of the eighth message by the uSPB, the uSPB can be converted into a configured secondary platform bundle, where the configured secondary platform bundle can successfully authenticate and/or establish a secure session with a network.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 1*a* is a graphical illustration of a system for a device to securely receive an unconfigured firmware image, including hardware, firmware, and software components for the device with a primary platform, in accordance with exemplary embodiments;

FIG. 1*c* is an illustration of an exemplary set of cryptographic parameters for a primary platform and a secondary platform bundle, in accordance with exemplary embodiments;

FIG. 2*b* is a simplified message flow diagram illustrating an exemplary system with exemplary data sent and received by (i) a device with a primary platform and unconfigured secondary platform bundle and (ii) a secondary platform bundle configuration server and the operation of a configured secondary platform bundle, in accordance with exemplary embodiments.

DETAILED DESCRIPTION OF EXEMPLARY EMBODIMENTS OF THE INVENTION

FIG. 1*a*

Figure 1B:
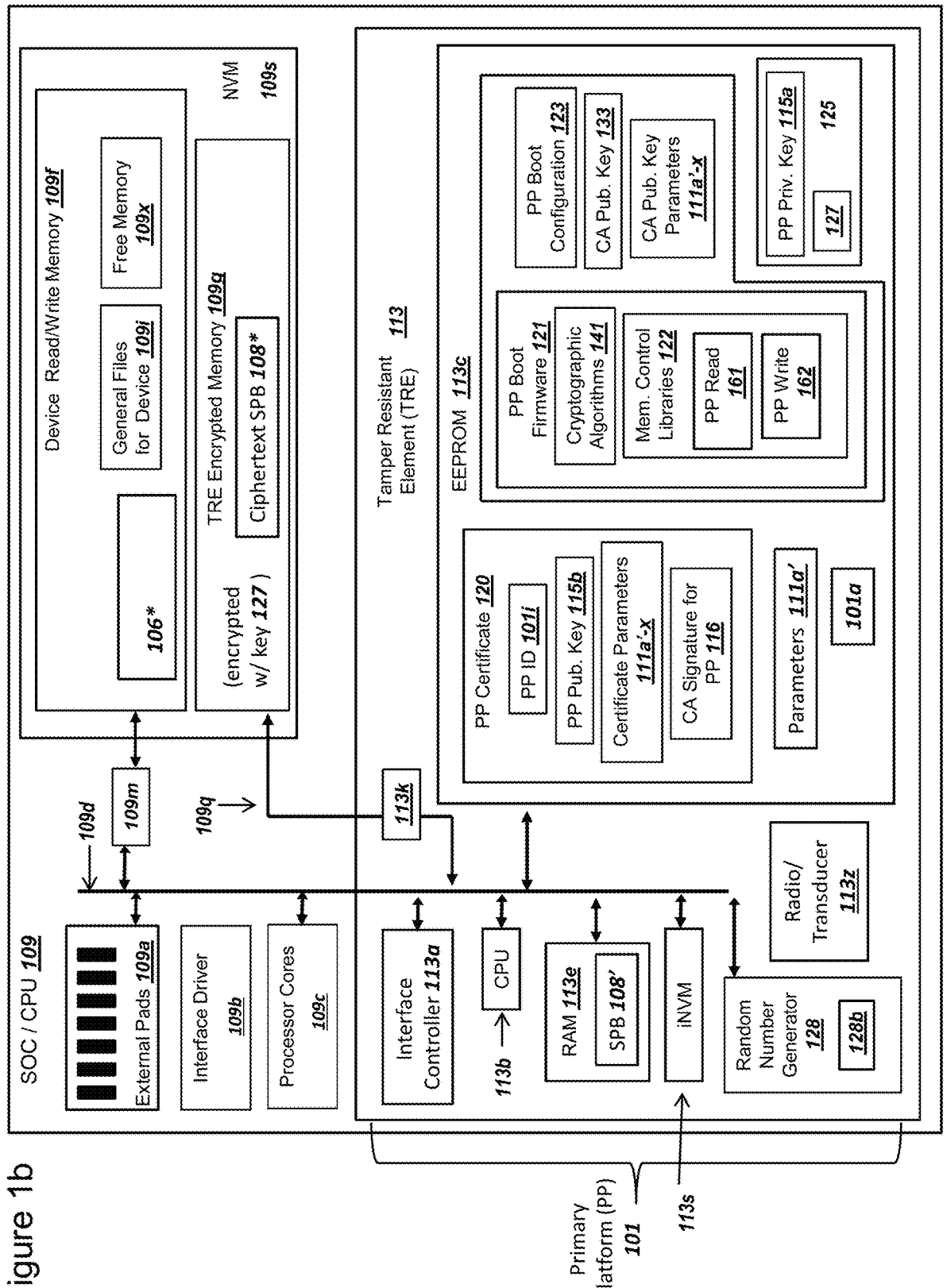
FIG. 1*b* is a graphical illustration of hardware, firmware, and software components for a device, including a tamper resistant element with a primary platform, in accordance with exemplary embodiments.

FIG. 1*a* is a graphical illustration of a system for a device to securely receive an unconfigured firmware image, including hardware, firmware, and software components for the device with a primary platform, in accordance with exemplary embodiments. System 100 can include a device 102 with a primary platform (PP) 101, an image delivery server 103, an image maker 199, and an IP network 105. The device 102 and image delivery server 103 can securely communicate over an Internet Protocol (IP) network 105. Image delivery server 103 can be referred to herein as server 103. Although a single server 103 and a single device 102 are depicted in FIG. 1*a*, a system 100 can comprise a plurality of servers 103 and devices 102. In addition, although a single server 103 is depicted in FIG. 1*a*, the exemplary server 103 shown for system 100 can comprise either different physical computers such as rack-mounted servers, or different logical or virtual servers or instances operating in a "cloud" configuration, including different computing processes which are geographically dispersed.

Server 103 could also represent different logical "server-side" processes within a network, including different programs running on a server that listen and communicate using different IP port numbers within one physical server. In exemplary embodiments, server 103 can operate using the physical electrical components similar to those depicted and described for a device 102 in FIG. 1*a*. Sever 103 can use electrical components with larger capacities and larger overall power consumption, compared to the capacity and power consumption for the equivalent electrical components in a device 102. Other possibilities exist as well for the physical embodiment of server 103 without departing from the scope of the present disclosure. In exemplary embodiments, a Secondary Platform Bundle Manager (SPBM) as described in the ETSI SSP Requirements document could operate an Image Delivery Server 103.

IP network 107 could be either a Local Area Network (LAN) or a Wide Area Network (WAN), or potentially a combination of both. IP network 107 could include data links supporting either Institute of Electrical and Electronics Engineers (IEEE) 802.11 (WiFi) standards. Device 102 could also utilize a variety of WAN wireless technologies to communicate data with server 103, including Low Power Wide Area (LPWA) technology, 3rd Generation Partnership Project (3 GPP) technology such as, but not limited to, 3G, 4G Long-Term Evolution (LTE), or 4G LTE Advanced, NarrowBand-Internet of Things (NB-IoT), LTE Cat M, 5G networks, and other examples exist as well. Server 103 can connect to the IP network 105 via a wired connection such as, but not limited to, an Ethernet, a fiber optic, or a Universal Serial Bus (USB) connection (not shown). IP network 105 could also be a public or private network supporting Internet Engineering Task Force (IETF) standards such as, but not limited to, such as, RFC 786 (User Datagram Protocol), RFC 793 (Transmission Control Protocol), and related protocols including IPv6 or IPv4. A public IP network 105 could utilize globally routable IP addresses and also comprise an insecure network.

Image maker 199 can comprise the source of an unconfigured firmware image 106 for a primary platform 101 operating in device 102. The unconfigured firmware image 106 as contemplated herein may also be referred to as a "generic" firmware image, "image 106", and also "firmware 106". In other words, an unconfigured firmware image 106 can support a plurality of different devices 102 with different PP 101, and a subsequent configuration step after download and receipt of the image 106 can be useful to address the multiple needs in the art described above. The configuration of a secondary platform bundle for a particular device 102 with TRE 113 and PP 101 can support secure subsequent operation of the secondary platform bundle 108'. In exemplary embodiments, a Secondary Platform Bundle Manager (SPBM) as described in the SSP Requirements document could also operate an image maker 199, or the SPBM with a server 103 could obtain the firmware 106 from a third party that operates image maker 199.

Although a single image maker 199 is depicted in FIG. 1a, a system 100 could include a plurality of different image makers 199, and a server 103 could select an image maker 199 based on data received from device 102, such as using the primary platform identity PP-ID 101i for TRE 113 and PP 101 in device 102. Many possibilities exist for the source and operation of a firmware 106 from an image maker 199 without departing from the scope of the present disclosure. A first image maker 199 could create a first firmware 106 which operates as an embedded SIM for machine-to-machine (M2M) devices, such as specified in GSMA standards SGP.02. A second image maker 199 could create a second firmware 106 which operates as an embedded SIM for consumer devices, such as specified in GSMA standard SGP.22. The operation of primary platform 101 as an embedded SIM may also be referred to as an embedded "Smart Secure Platform" (eSSP). Or, the first image maker 199 could create both the first and second firmwares 106. A third image maker 199 could create a third firmware 106 that supports PP 101 operating as a credit card for banking transactions.

A fourth image maker 199 could create a third firmware 106 to operate with the same functions as a Universal Integrated Circuit Card (UICC) as described in section 6.2 of the SSP Requirements document, such as for banking applications or storing and using network access credentials. Thus, the fourth image maker 199 could create a firmware 106 for the operation of primary platform 101 as an integrated "Smart Secure Platform" (iSSP). Further, image maker 199 could create firmware 106 for other secure functions of a primary platform 101 operating in a secure environment such as TRE 113 for device 102, including digital identification, electronic payments, authentication tokens, etc. without departing from the scope of the present disclosure. As discussed above, a plaintext unconfigured firmware 106 can provide machine executable instructions and cryptographic data such as algorithms and keys for a TRE 113 to conduct secure cryptographic operations for device 102 after configuration of the firmware 106 (such as the configuration steps depicted and described in connection with FIG. 2a and FIG. 2b below).

Device 102 can be a computing device for sending and receiving data, including a wireless device. Device 102 can take several different embodiments, such as a general purpose personal computer, a mobile phone based on the Android® from Google® or the IOS operating system from Apple®, a tablet, a device with a sensor or actuator for the "Internet of Things", a module for "machine to machine" communications, a device that connects to a wireless or wired Local Area Network (LAN), and other possibilities exist as well without departing from the scope of the present disclosure. Device 102 can also be a computing device according to GSMA technical document "iUICC POC Group Primary Platform requirements", Approved Release 1.0 dated May 17, 2017, which is hereby incorporated by reference in its entirety ("GSMA PP Requirements"). Device 102 can comprise a device such as that depicted in FIG. 6 on page 24 of the GSMA PP Requirements. Exemplary electrical components within a device 102 are depicted and described in FIG. 1a. Other possibilities exist as well for the physical embodiment of device 102 without departing from the scope of the present disclosure.

Device 102 in FIG. 1a is illustrated to include many components that can be common within a device 102, and device 102 may also operate in a wireless configuration in order to connect with a wireless network. In a wireless configuration, the physical interface 102a of device 102 may support radio-frequency (RF) communications with networks including a wireless network via standards such as Global System for Mobile Communications (GSM), Universal Mobile, Telecommunications System (UMTS), mobile WiMax, Core-division multiple access (CDMA), LTE, LTE Advanced, 5G, and/or other mobile-network technologies. In a wireless configuration, the physical interface 102a may also provide connectivity to local networks such as 802.11 Wireless Local Area Network (WLANA), Bluetooth, Zigbee, or an IEEE 802.15.4 network, among other possibilities. In a wireless configuration, device 102 could use a physical interface 102a connected with both a wireless WAN and wireless LAN simultaneously. In a wired configuration, the physical interface 102a can provide connectivity to a wired network such as through an Ethernet connection or USB connection.

The physical interface 102a can include associated hardware to provide connections to components such as radio-frequency (RF) chipsets, a power amplifier, an antenna, cable connectors, RF filters, etc. Device drivers 102g can communicate with the physical interfaces 102a, providing hardware access to higher-level functions on device 102. Device drivers 102g may also be embedded into hardware or combined with the physical interfaces. Device drivers 102g can include an Open Firmware Loader (OFL) and Primary Platform (PP) agent 102x, which can be utilized by a device 102 and operating system 102h in order to read and write data to TRE 113 via external pads 109a and bus 109d (shown in FIG. 1b below), including communicating with a primary platform 101 within TRE 113. Device 102 may preferably include an operating system 102h to manage device drivers 102g and hardware resources within device 102. The operating systems described herein can also manage other resources such as memory and may support multiple software programs or software libraries operating on device 102, including applications that communicate with PP 101 through a device driver 102g, such as agent 102x.

The operating system 102h can include Internet protocol stacks such as a User Datagram Protocol (UDP) stack, Transmission Control Protocol (TCP) stack, a domain name system (DNS) stack, etc., and the operating system 102h may include timers and schedulers for managing the access of software to hardware resources, including TRE 113. The operating system shown of 102h can be appropriate for a low-power device with limited memory and central processing unit (CPU), resources (compared to a server 103). Example operating systems 102h for a device 102 includes Linux, Android® from Google®, IoS from Apple®, Windows® Mobile, or Open AT® from Sierra Wireless®. Additional example operating systems 102h for device 102 include eCos, uC/OS, LiteOs, Contiki, OpenWRT, Raspbian, and other possibilities exist as well without departing from the scope of the present disclosure. Note that other operating systems for computing devices in a system 100 can include the functionality of operation system (OS) 102h, such as the SPB OS 108h.

A device program 102i may be an application programmed in a language such as, but not limited to, C, C++, Java, and/or Python, and could provide functionality to support M2M applications such as remote monitoring of sensors and remote activation of actuators. A device program 102i could also comprise an application for a mobile phone, table, personal computer, or the like. Device program 102i could also be a software routine, subroutine, linked library, or software device, according to one preferred embodiment. As contemplated herein, a device program 102i may be an application operating within a smartphone, such as an iPhone® or Android®-based smartphone, and in this case device 102 could comprise the smartphone. The application functioning as a device program 102i could be downloaded from an "app store" associated with the smartphone. Device program 102i can include secure session library 102y, which can provide the functionality or "System on a Chip" (SOC) 109 instructions for conducting secure sessions with servers or authenticating with a network using keys, certificates, and identities within the primary platform 101. Note that a SSP app 108d within a SPB 108 can operate in an equivalent manner within TRE 113 as a device program 102i for device 102 (but with more restricted resources and fewer external interfaces).

Many of the logical steps for operation of device 102 can be performed in software and hardware by various combinations of sensor 102f, actuator 102z, physical interface 102a, device driver 102g, operating system 102h, device program 102i, and SOC 109. Note that device 102 may also optionally include user interface 102j which may include one or more devices for receiving inputs and/or one or more devices for conveying outputs. User interfaces are known in the art for devices 102 and could include a few light-emitting diode (LED) lights or liquid-crystal display (LCD) display or organic light-emitting diode (OLED) display, and thus user interfaces are not described in detail here. User interface 102j could comprise a touch screen if device 102 operates as a smartphone or mobile phone. As illustrated in FIG. 1a, device 102 can optionally omit a user interface 102j, since no user input may be required for many M2M or "Internet of Things" applications, although a user interface 102j could be included with device 102. For embodiments with a user interface 102j, a user authentication method 206a (described below) can specify the required input and user interface 102j for SPB 108' to authenticate with a network 250.

Device 102 may be a computing device or wireless device that includes computer components for the purposes of collecting data from a sensor 102f or triggering an action by an actuator 102z. Device 102 may include a central processing unit (CPU) within SOC 109 (such as processor cores 109c depicted and described in connection with FIG. 1b below), a random access memory (RAM) 102e, and a system bus 102d that couples various system components including the random access memory 102e to the processing unit 102b. The system bus 102d may be any of several types of bus structures including a memory bus or memory controller, a peripheral bus, and a local bus using any of a variety of bus architectures including a data bus.

Device 102 can include a SOC 109 and SOC 109 is also depicted and described in connection with FIG. 1b below. SOC 109 can include TRE 113, and additional details for the operation of SOC 109 and TRE 113 is provided in subsequent figures. Although TRE 113 is depicted in FIG. 1a as operating within SOC 109, TRE 113 could be operated within a removable unit such as an SD card, a SIM card, etc. Or TRE 113 could operate within a separate soldered chip connected to bus 102d. An exemplary removable form factor for TRE 113 could comprise a standard secure digital (SD) card, a mini SD card, a micro SD card, a mini UICC, a micro UICC, or a nano UICC, and other possibilities exist as well without departing from the scope of the present disclosure. SOC 109 can include electrical contacts (such as external pads 109a depicted in FIG. 1b) which provide electrical connectivity to bus 102d. For some embodiments, TRE 113 can comprise the entire SOC 109, and the primary platform 101 can be a portion of the TRE 113.

SOC 109 can include NAND or NOR flash memory in order to record data when device 102 is not powered, and other nonvolatile memory technologies can be used in a storage unit as well without departing from the scope of the present disclosure. SOC 109 can be separately manufactured from device 102 and accessed and loaded with data before insertion into device 102. SOC 109 could also operate as an "embedded" unit, such that a storage unit comprises an integrated circuit soldered to a circuit board in device 102, and in these embodiments SOC 109 can be fixed and not removable.

In exemplary embodiments, SOC 109 can include a TRE 113, and additional details regarding the components and operation of a TRE 113 are depicted and described in additional figures below, including FIG. 1b. The inclusion of TRE 113 and the operation of TRE 113 with PP 101 in SOC 109 can add functionality for SOC 109 that is not normally included in commercially available SOC in the market as of 2019, such as with the secure configuration of unconfigured firmware 106 as described herein. TRE 113 within SOC 109 can include a processor, bus, and memory similar (but with less power and on a smaller scale) as a separate processing core operating within SOC 109, bus 102d, and read-only memory (ROM) 102c. TRE 113 can perform cryptographic functions using either boot firmware or downloaded firmware 106 in the form of a secondary platform bundle 108' such as (i) internally deriving a private key for a PKI key pair in a cryptographically secure manner, (ii) recording the private key in a protected memory such that device 102 or external parties cannot feasibly or cost-effectively read the derived private key, and (ii) conducting key exchanges or key encapsulation/decapsulation and encryption/decryption.

Tamper resistant element (TRE) 113 can comprise a tamper resistant element as described in the GSMA PP Requirements document. TRE 113 can also comprise the secure element as described in the ETSI SSP Requirements document. Tamper resistant element 113 can comprise a silicon enclave within a tamper resistant chip such as a "system on chip" as depicted and described in connection with FIG. 1b below. TRE 113 can include a primary platform (PP) 101, where a primary platform is also described in both the GSMA PP Requirements document and the SSP Requirements document. TRE 113 could also comprise a "Smart Secure Platform" (SSP) as described in the SSP Requirements document, such as the SSP depicted in FIG. 2 of the "Architecture" section 9.2.10. Note that draft specifications for an SSP such as "103 666-2 iSSP Draft Specification 0.14.0" are not published and have restricted access on the ETSI web site as of Oct. 25, 2019. Primary platform 101 can comprise a secure operating environment, a secure enclave, a secure element, and include a dedicated processing core within a processor for device 102. Primary platform 101 can also operate in a Trusted Execution Environment (TEE) within a processor for device 102. Primary platform 101 can also comprise a SSP as contemplated by ETSI documents and draft specifications for 5G networks. Exemplary components for a TRE 113 and PP 101 for a device 102 are also depicted and described in connection with FIG. 1b below.

TRE 113 and PP 101 can support a variety of applications. TRE 113 can comprise the physical device such as that depicted in FIG. 1a and FIG. 1b below, and a primary platform 101 can comprise a secure processing environment operating within the TRE 113. With appropriate configured secondary platform bundle 108', TRE 113 and PP 101 could operate as an "integrated universal integrated circuit card" ((MCC), an "embedded universal integrated circuit card" (eUICC), a secure element for banking applications or payments from mobile phones, an radio-frequency identity (RFID) card, a secure bootstrap environment for device 102, a virtual key for cars or door locks, an secure environment for recording an identity and secret or private keys for drivers licenses, passports, online or web-site access, etc. Other applications for firmware 106 operating in TRE 113 and PP 101 are possible as well, without departing from the scope of the present disclosure. In general, cryptographic keys and cryptographic algorithms and parameters could be stored in PP 101 in order to securely support applications such as device programs operating on device 102. In this manner, an insecure device program also operating on device 102 would not feasibly be able to read the cryptographic keys or use the cryptographic algorithms stored in PP 101.

Each of the above exemplary applications can be operated by a configured secondary platform bundle 108' running within TRE 113 on PP 101. Although a single secondary platform bundle 108' is depicted and described in connection with FIG. 1a and FIG. 1b below, a TRE 113 and PP 101 can operate a plurality of different secondary platform bundles 108' simultaneously. Each configured SPB 108' can operate within a virtual machine for a processor 113b (in FIG. 1b) for TRE 113 and PP 101. As one exemplary embodiment, SPB 108' can comprise a JAVA applet running on a java virtual machine in TRE 113, where the JAVA virtual machine can be recorded in secure boot firmware 121 for TRE 113 and PP 101 (shown in FIG. 1b below). Different SPB 108' operating within TRE 113 can be isolated from each other by conventional technology for processing hosts and/or virtual machines. Other possibilities exist as well for a TRE 113 and PP 101 to operate as a host for an application downloaded as a SPB 108 within firmware 106. In summary, the overall security of an application operated by TRE 113 and PP 101 can depend on securely configuring or installing an unconfigured SPB 108 for TRE 113 and PP 101.

Although the exemplary environment described herein employs ROM 102c, RANI 102e, and nonvolatile memory (NVM) 102s, it should be appreciated by those skilled in the art that TRE 113 could also operate within other types of computer readable media which can store data that is accessible by a device 102, such as memory cards, subscriber identity device (SIM) cards, local miniaturized hard disks, and the like, which may also be used in the exemplary operating environment without departing from the scope of the disclosure. The memory and associated hardware illustrated in FIG. 1a provide nonvolatile storage of computer-executable instructions, data structures, program devices, device program 102i, device drivers 102g, and other data for computer or device 102. Note the device 102 may include a physical data connection at the physical interface 102a such as a miniaturized universal serial bus adapter, firewire, optical, or other another port and the computer executable instructions such as device program 102i, operating system 102h, or device driver 102g can be initially loaded into memory such as ROM 102c or NVM 102s through the physical interface 102a before device 102 is given to an end user, shipped by a manufacturer to a distribution channel, or installed by a technician.

Further, device program 102i, operating system 102h, or device driver 102g can be separately loaded into NVM 102s before or after distribution of device 102. In some exemplary embodiments, applications or programs operating within device 102 can be given limited or restricted access to TRE 113 through agent 102x in order to support the applications or programs. For example, a mobile payment application operating a device program 102i could authenticate either device 102 or a user with keys recorded in TRE 113 and a configured secondary platform bundle 108'. Device program 102i could provide a graphical user interface (GUI) to a user through user interface 101j. Other possibilities exist as well for a device program 102i to operate in conjunction with (i) keys and identities recorded in TRE 113 and (ii) agent 102x communicating with TRE 113 and PP 101 without departing from the scope of the present disclosure.

A number of program devices may be stored in RAM 102e, ROM 102c, or NVM 102s, including an operating system 102h, device driver 102g, an http client (not shown), a DNS client, and related software. TRE 113 can record program devices as well, where the program devices in TRE 113 may be focused on cryptographic operations and functions conducted within TRE 113 in support of the operation of device 102. A firmware 106 depicted and described in connection with FIG. 1a and other figures herein can comprise a program device. Program devices include routines, sub-routines, programs, objects, components, data structures, etc., which perform particular tasks or implement particular abstract data types.

Aspects of the present disclosure may be implemented in the form of (i) a device program 102i which are executed by the device 102 working in conjunction with (ii) a configured secondary platform bundles 108' on TRE 113 and PP 101 to authenticate device 102 with a server or a network (such as with authentication 251 in FIG. 2b below). In addition, aspects of the present disclosure may be implemented in the form of (i) a device program 102i which are executed by the device 102 working in conjunction with (ii) a configured secondary platform bundles 108' on TRE 113 and PP 101 to authenticate device 102 with another local computing device, such as a payment card reader, an RFID reader, a remote wireless lock for a car, etc. In exemplary embodiments, program devices for TRE 113 in SOC 109 can include cryptographic parameters 111a' as depicted and described in connection with FIG. 1c below.

A user may enter commands and information into device 102 through an optional user interface 102j, such as a keypad, keyboard (possibly miniaturized for a mobile phone form-factor), and a pointing device or a touch screen on a phone or display. Pointing devices may include a trackball, an electronic pen, or a touch screen. A user interface 102j may also include a display (not shown) such as a device screen. A display may also be connected to system bus 102d via an interface. The display can comprise any type of display devices such as a liquid crystal display (LCD), a plasma display, and an organic light-emitting diode (OLED) display. Device 102 may also include a camera (not shown) connected to or integrated with device 102 through a physical interface 102a, and the camera can comprise a video camera for the device 102 to collect sensor data that includes video or images. The camera (not shown) can be a CCD (charge-coupled device) camera, a CMOS (complementary metal-oxide-semiconductor) camera, or a similar device to collect video or camera input including QR codes. Other arrangements could be used as well, without departing from the disclosure.

The device 102, comprising a computer, may operate in a networked environment using logical connections to one or more remote computers, such as servers. Servers communicating with device 102 can also function as a general purpose server to provide files, programs, disk storage, remote memory, and other resources to device 102 usually through a networked connection. Additional remote computers with which device 102 communicates may include another device 102 or mobile device, an M2M node within a capillary network, a personal computer, other servers, a client, a router, a network PC, a peer device, a wireless network, or other common network nodes. The servers or networks communicating with device 102 or a remote computer typically includes many of the elements described above relative to the device 102, including a CPU, memory, and physical interfaces. It will be appreciated that the network connections shown throughout the present disclosure are exemplary and other means of establishing a wireless or wired communications link may be used between mobile devices, computers, servers, corresponding nodes, and similar computers.

The operation of a TRE 113 within device 102 with a firmware 106 can be utilized to (i) authenticate a device 102 and (ii) establish secure communications in each or any of the above described networking environments. In addition and as described above, the operation of TRE 113 can support other secure applications such as, but not limited to, (i) verifying a user of device 102 is authorized, (ii) conducting payment transactions with a server or remote computing device from device 102, (iii) secure local networking such as connecting device 102 to a LAN, (iv) monitoring and verifying software and firmware downloads for device 102 for prohibiting malware or unauthorized software to operate in a general processor 109c. Other possibilities exist as well for the operation of TRE 113 with secure applications and firmware 106 and a configured secondary platform bundle 108' without departing from the scope of the present disclosure.

The (i) device program 102i operating within device 102 illustrated in FIG. 1a and communicating with TRE 113 through agent 102x or (ii) SSP App 108d can provide computer executable instructions to hardware such as SOC 109 through a system bus 102d or 109d (for SSP App 108d in FIG. 1b below) in order for a device 102 to (i) transmit and receive data with a service provider, LAN, or another local computing device (ii) monitor a sensor and/or change the state of an actuator 102z, (iii) send or receive packets with a server or network, LAN, or another local computing device, and (iv) authenticate with a server, thus allowing the server to remotely monitor or control device 102 in an authenticated and secure manner. The device program 102i can enable the device 102 to authenticate and communicate with a server by recording data in memory such as RAM 102e, where the data can include sensor data, a destination IP address number, a packet or packet header value, an encryption or ciphering algorithm and key, a digital signature and public key, etc, where cryptographic operations or calculations for the device program 102i can be performed by TRE 113 and Primary Platform 101 using a configured secondary platform bundle 108'.

The data recorded in RAM 102e can be subsequently read by the operating system 102h or the device driver 102g. The operating system 102h or the device driver 102g can write the data to a physical interface 102a using a system bus 102d in order to use a physical interface 102a to send data such as a digital signature for authentication to a server using the IP network 105. In exemplary embodiments, the digital signature can be generated or processed in the TRE 113 using a PP 101 and a configured secondary platform bundles 108' using a private key SK.SP 213a. Alternatively, the device program 102i can write the data directly to the physical interface 102a using the system bus 102d.

In general, digital signatures for authentication with a server or network can be performed in TRE 113 by a PP 101 using SPB 108', where the digital signature output is transferred from TRE 113 to RAM 102e before being transmitted from device 102 to a server through the IP network 105. For some embodiments, TRE 113 can conduct secure transactions or communication on a LAN or with another local computing device and the IP network 105 could be omitted. The data recorded in RAM 102e such as a digital signature can be subsequently read by the operating system 102h or the device driver 102g. Note that device driver 102g can include OFL and PP agent 102x in order to communicate with TRE 113. Thus, OFL and PP agent 102x can be a device driver 102g specifically for TRE 113. The operating system 102h or the device driver 102g can write the data to a physical interface 102a using a system bus 102d in order to use a physical interface 102a to send data such as a digital signature for authentication to a server using the IP network 105. Alternatively, the device program 102i can write the data directly to the physical interface 102a using the system bus 102d. Other possibilities exist as well without departing from the scope of the present disclosure.

The device program 102i or operating system 102h using TRE 113 and PP 101 with a configured secondary platform bundle 108' can include steps to process the data recorded in memory such as encrypting data, selecting a destination address, or encoding sensor data acquired by (i) a sensor 102*f* or (ii) through a physical interface 102*a* such as a thermocouple, shock or vibration sensor, light sensor, or global positioning system (GPS) receiver, etc. The device 102 can use the physical interface 102*a* such as a radio to transmit or send (i) the data from a sensor or (ii) a digital signature from TRE 113 with a configured secondary platform bundle 108' to a wireless network. For those skilled in the art, other steps are possible as well for a device program 102*i* or operating system 102*h* to collect data from either (i) a sensor 102*f* or (ii) a configured secondary platform bundle 108' in a TRE 113 with PP 101 and send the data in a packet without departing from the scope of the present disclosure.

Conversely, in order for device 102 to receive a packet or response from a server or another local computing device for device 102, which could include a challenge or nonce or random number in order to authenticate a device 102, the physical interface 102*a* can use a radio to receive the challenge or nonce from a wireless network. The challenge or nonce received from the server through the wireless network could comprise a random number or a pseudo random string of digits, bits, and/or characters. The received data can include information from a server and may also comprise a datagram, a source IP address number, a packet or header value, an instruction for device 102, an acknowledgement to a packet that device 102 sent, a digital signature, and/or encrypted data. The operating system 102*h* or device driver 102*g* can use a system bus 102*d* and a processing unit in SOC 109 to record the received data such as a challenge or nonce from a server in memory such as RAM 102*e*, and the device program 102*i* or operating system 102*h* may access the memory in order to process the received data and determine the next step for the device 102 after receiving the data.

Processing the received data from a server to device 102 could include (i) deciphering or decrypting received data by device 102 with a symmetric ciphering key recorded by a configured secondary platform bundle 108' in TRE 113 and PP 101, (ii) sending the challenge or nonce to the TRE 113 for the SPB 108' to generate a digital signature, reading an instruction from a server, or similar transformations of the received data. The steps within the paragraph above may also describe the steps a device program 102*i* can perform in order to receive and process a packet from a server or a network. For those skilled in the art, other steps are possible as well for a device program 102*i* or device 102 to receive a packet or challenge or nonce from a server without departing from the scope of the present disclosure. A server described herein without the designation of "server 103" or IDS server 103 can comprise a different server than server 103 communicating with device 102 in support of an application operating as a device program 102*i*. Thus, a system 100 can include other servers and networks for a device 102 to communicate with besides IDS server 103, including a local computing device connected to device 102 without an IP network 105.

Moreover, those skilled in the art will appreciate that the present disclosure may be implemented in other computer system configurations, including hand-held devices, netbooks, portable computers, multiprocessor systems, microprocessor based or programmable consumer electronics, network personal computers, minicomputers, mainframe computers, servers, and the like. The disclosure may also be practiced in distributed computing environments, where tasks are performed by remote or local processing devices that are linked through a communications network. In a distributed computing environment, program devices may be located in both local and remote memory storage devices.

In addition, the terms "mobile node", "mobile station", "mobile device", "M2M device", "M2M device", "networked sensor", or "industrial controller" can be used to refer to device 102 as contemplated herein.

Although not depicted in FIG. 1*a*, a server shown above in FIG. 1*a* such as IDS server 103 and other servers as well can include equivalent internal components as device 102 in order to operate. The server 103 in FIG. 1*a* could include a processor similar to SOC 109, with primary differences for the processor server being increased speed, increased memory cache, an increased number and size of registers, the use of a 64 bits for datapath widths, integer sizes, and memory address widths, as opposed to an exemplary 32 bits or 64 bits for processor cores in SOC 109 or an exemplary 32 or 16 bits for a processor in TRE 113. Other possibilities exist as well for the size of datapath widths for a TRE 113 and processing core in device 102 without departing from the scope of the present disclosure.

Similarly, RAM in a server could be a RAM similar to RAM 102*e* in device 102, except the RAM in a server could have more memory cells such as supporting exemplary values greater than an exemplary 16 gigabytes, while RAM in device 102 could support fewer memory cells such as less than an exemplary 16 gigabytes. Non-volatile memory for storage in a server 103 in FIG. 1*a* could comprise disks, "solid state drives" (SSDs) or "storage area networks" (SAN) for a server. For a physical interface 102*a*, in exemplary embodiments, a server 103 in FIG. 1*a* could use a physical, wired LAN interface such as a high-speed Ethernet or fiber optic connection in order to connect with an IP network 105.

At step 150, image maker 199 generates or processes firmware 106 for primary platform 101 operating in TRE 113. Image maker 199 could create a common firmware 106 for a collection of devices 102 with TRE 113, such as a firmware 106 comprising a Java applet or application for operating an embedded universal integrated circuit card (eUICC) or simply an integrated universal integrated circuit card (iUICC). Other applications for a secondary platform bundle 108 within a firmware 106 are possible as well. Firmware 106 could also be machine executable code, such as byte code, for other platforms as well and may also support other applications such as firmware for running or operating a "Smart Secure Platform" within TRE 113. TRE 113 can include a primary platform 101 for processing and operating the firmware 106.

A step 150 can comprise compiling or assembling source code for firmware 106 into machine executable code or byte code. A first firmware 106 in a step 150 could be for a first processor type of CPU 113*b* and PP boot firmware 121 for a first class of device 102 (depicted in FIG. 1*b* below), and a second firmware 106 in a step 150 could be for a second processor type of CPU 113*b* and PP boot firmware 121 for second class of device 102, and other possibilities exist as well. Image maker 199 and IDS 103 could select the first or second image 106 (or other images) using identity information from PP 101 in a message 151, such as PP-ID 101*i*. For some embodiments, such as with the use of Java and byte code for firmware 106, the firmware 106 may not depend on the type of processor for a CPU 113*b* in device 102 and the PP boot firmware 121 can be both (i) specific for the processor type of CPU 113*b* and (ii) support PP 101 operating firmware 106 that can be operated independent of the processor type for CPU 113*b*. In exemplary embodiments, image maker 199 can comprise a collection of servers, such that a first server processes the firmware 106 offline and encrypts the data of firmware 106 before storing the ciphertext firmware 106* in a second server for image maker 199, where the second server is connected to IP network 105 with IDS server 103. Thus the firmware transferred between image maker 199 and IDS 103 could comprise a ciphertext firmware 106*.

In exemplary embodiments, an unconfigured firmware image 106 generated by an image maker 199 can include a configuration package 107 and an unconfigured secondary platform bundle (uSPB) 108. The configuration package 107 could also be referred to an installation package or an installation and/or configuration program. The configuration package can include an identity for a secondary platform bundle configuration server 201 of ID.SPB-CS 201$i$, a certificate for the secondary platform bundle configuration server 201 of Cert.SPB-CS 201$c$, and TLS parameter 107$k$ for conducting a TLS or secure session with configuration server 201. Note that the configuration server 201 is depicted and described in connection with FIG. 2$a$ and FIG. 2$b$ below. Although a configuration package 107 is depicted as external to uSPB 108, in some exemplary embodiments, configuration package 107 could be stored within uSPB 108. Or, in other exemplary embodiments, two separate firmware images 106 could be provided to image delivery server 103 or use by image delivery server 103, where a first image 106 includes the configuration package 107 and a second image 106 includes the uSPB 108. Other possibilities exist as well for the use of a configuration package 107 and uSPB 108 by an IDS 103 and PP 101 without departing from the scope of the present disclosure.

The unconfigured firmware image 106 can also include an unconfigured secondary platform bundle (uSPB) 108. As contemplated herein, the unconfigured secondary platform bundle (uSPB) 108 is designated without an apostrophe or "prime" marker or designation, and the configured secondary platform bundle 108' is designated with an apostrophe or "prime" marker or designation. For example, the configured SPB 108' with configured data is depicted in FIG. 2$b$ below. An objective of the present disclosure is for securely conducting the steps and message flows necessary to convert an uSPB 108 into a configured SPB 108', such that the configured SPB 108' can support device 102 (i) authenticating and encrypting data with external servers and networks.

The uSPB 108 can include a secondary platform identity of ID.SP 108$a$, supported cryptographic parameters 111$a''$, selected cryptographic parameters, a secret key for the secondary platform SK.SP 213$a$, a public key for the secondary platform PK. SP 213$b$, and a certificate for the secondary platform Cert.SP 108$c$. As depicted in FIG. 1$a$, the values in an unconfigured SPB 108 can comprise null, temporary, or empty values. In other words, an unconfigured SPB 108 can include the depicted "null/temporary" values (possibly in the form of placeholders or defined variables without associated data or values), where the actual values for operation of the configured SPB 108' can be recorded by PP 101 and SPB 108' after the configuration steps depicted in FIGS. 2$a$ and 2$b$.

Consequently, an unconfigured SPB 108 can support distribution of a common image 106 to a plurality of different devices 102 without requiring unique values for each device 102 (such as ID.SP 108$a$, SK.SP 213$a$, etc.) to be stored within the uSPB 108 within firmware 106. In this manner, the distribution of image 106 can be flexible, and a single image 106 shared across a plurality of devices 102. For exemplary embodiments, the use of image 106 with uSPB 108 can support the transfer of a single image 106 to thousands or more different devices 102. Further, by both (i) omitting secret keys such as SK.SP 213$a$ and (ii) subsequently deriving the key within a PP 101 in each device 102, the security of a device 102 can be significantly enhanced, since the secret key SK. SP 213$a$ is not recorded on any server or location outside of device 102 and the corresponding TRE 113 and primary platform 101.

Firmware 106 with an unconfigured SPB 108 can provide machine executable instructions or byte code for a processor in PP 101 (such as processor 113$b$ depicted and described in connection with FIG. 1$b$) to execute or run. Firmware 106 could comprise a collection of compiled software libraries and programming code for the operation of TRE 113 and PP 101. Firmware 106 could comprise a Java-based applet or application, where boot firmware 121 of PP 101 (depicted and described in connection with FIG. 1$b$ below) establishes and operates a Java virtual machine such as, but not limited, to JamVM or HaikuVM. Other platforms for virtualization and emulation of a computer system by PP 101 are possible as well, without departing from the scope of the present disclosure, where firmware 106 can be compiled or formatted to operate on PP 101 operating as a host for the virtualized computer system. In exemplary embodiments, firmware 106 can comprise an application where PP 101 operates as a process virtual machine or an application virtual machine. The environment in which firmware 106 operates within PP 101 can also be referred to as a managed runtime environment (MRE).

Firmware 106 can comprise compiled software or machine executable instructions or byte code for either (i) a processor or (ii) a virtual machine in PP 101, and may also be referred to herein as an "image". In other words, although (A) firmware may traditionally refer to machine executable programming instructions that provides low-level or hardware control over computing hardware, such as memory and physical interfaces, as contemplated herein, (B) "firmware" or a secondary platform bundle can comprise higher level software written for a virtual machine. In addition, the computing environment of a primary platform can require secure functions such as writing and reading cryptographic keys for a firmware 106 specially designated protected memory, and thus firmware 106 comprising high level software may include features similar to traditional firmware.

Further, firmware may be traditionally associated with machine executable instructions that are read from a read only memory, and firmware 106 comprising software that is loaded into primary platform 101 can have features after loading in PP 101 that are similar to traditional firmware, such as firmware 106 not being readily modified by an insecure processor in device 101. In any case, although "firmware 106" is described herein as firmware and the firmware can comprise the secondary platform bundle 108, "firmware 106" and a secondary platform bundle 108 and configuration package 107 can comprise any collection of machine executable instructions or byte code which can be loaded and operated by primary platform 101. Similarly, the GSMA PP Requirements document refers to the collection of machine executable code for a primary platform as "firmware".

Cryptographic parameters 111$a''$ for uSPB 108 can specify values or settings for (i) conducting an elliptic-curve Diffie-Hellman (EDCH) or elliptic-curve Diffie Hellan ephemeral (EDCHE) key exchange, (ii) mutually deriving a symmetric ciphering key, (iii) using a symmetric ciphering algorithm, (iv) an elliptic-curve cryptography (ECC) curve which could comprise a commonly used name curve, (iv) PKI key lengths, and/or (v) conducting post-quantum cryptography (PQC) key exchange mechanisms (KEM) and digital signature algorithms, etc. Exemplary cryptographic parameters 111a" for uSPB 108 supporting PQC algorithms are also depicted and described in connection with FIG. 1c below. As contemplated herein, cryptographic parameters 111 (and subsets such as 111a', 111a", and 111a''') may also be referred to as parameters 111, and a detailed description of cryptographic parameters 111 is depicted and described in connection with FIG. 1c below. Cryptographic parameters 111 can also support and/or specify cryptographic algorithms other than ECC, such as algorithms for post-quantum cryptography. Each of PP 101, configuration server 103, and uSPB 108 can record at least one compatible and mutually supported subset of parameters within a set of cryptographic parameters 111. The at least one compatible and mutually supported subset of cryptographic parameters can comprise the selected operating set of cryptographic parameters 111a'''-x as depicted and described in connection with FIG. 1c and FIG. 2a below.

The uSPB 108 can also include an SSP application 108d. The SSP application can support the example applications of storing and processing network access credentials, embedded SIMs, banking credentials, user identity credentials such as drivers license identities or other government issued identities, keys for an electronic wallet, keys and algorithms for RFID authentication, keys and algorithms for payment transactions, etc. The uSPB 108 can also include an operating system 108h for a secondary platform operating within a primary platform 101, where operating system 108h can be similar to operating system 102h for device 102 above, except OS 108h can have reduced functionality for the embedded system and secure element contemplated for a TRE 113. OS 108h can include a set of certificate authority or certificate issuer certificates 108j, such as exemplary root certificates for certificate authorities. OS 108h can also include TLS parameters 108k for an operating secondary platform from SPB 108' to communicate with external servers from device 102 using secure sessions. Other secure protocols besides TLS could be supported and defined within parameters 108k as well. For some embodiments, the use and inclusion of OS 108h within uSPB 108 can be omitted, such as if uSPB 108 comprises a Java application.

IDS server 103 could receive a firmware 106 and from a secure channel with an image maker 199, which is also depicted in FIG. 6 of the GSMA PP Requirements document. The image maker could be a different server for the processing and creation of images for PP 101 than a server 103. Note that IDS server 103 could communicate with a plurality of different image makers, and the IDS server 103 could select or query for an image 106 for PP 101 using the PP-ID received with TRE credentials 151.

In order to obtain firmware 106 from IDS 103, device 102 using agent 102x could generate a message 151 with TRE credentials for TRE 113. In exemplary embodiments, the message 151 with TRE credentials could support the TRE credentials as described in sections 2.2.3, and 2.3 of the GSMA PP Requirements document. TRE credentials in message 151 could include an identity for PP 101 of PP-ID 101i. Note that TRE credentials in message 151 can be encrypted using static and ephemeral PKI keys with ECDHE key exchanges from both TRE 113 and IDS 103, as also described in the GSMA PP Requirements document. Note that TRE credentials in message 151 can be encrypted using static and ephemeral PKI keys supporting post-quantum cryptography (PQC) key exchange mechanisms (KEM).

A primary platform identity of PP-ID 101i can comprise a string of digits or alphanumeric characters to uniquely globally identify PP 101. PP-ID 101i can allow an IDS server 103 to identify the PP 101 for receiving an encrypted firmware 106. In exemplary embodiments, PP-ID 101i can be similar to either (i) an integrated circuit card identity (ICCID) found on SIM cards or (ii) an embedded universal integrated circuit card (eUICC) identity of "EID". For other embodiments, PP-ID 101i can comprise a universally unique identifier (UUID). In exemplary embodiments, PP-ID 101i can be written to hardware in PP 101 and operate as a unique, long-term identity for PP-ID 101i. For some exemplary embodiments, PP-ID 101i can comprise a cryptographic hash such as a secure hash algorithm (SHA) SHA-256 hash value of a primary platform static public key PK.PP 115b (depicted in FIG. 1b) based on a set of cryptographic parameters 111a, which could specify a secure hash algorithm to use over PK.PP 115b. For these embodiments, then PP-ID 101i can also potentially comprise multiple different reasonably unique values, depending on the hash algorithm specified in cryptographic parameters 111a (e.g. a first PP-ID 101i for a first hash algorithm and a second PP-ID 101i for a second hash algorithm). Other examples for an identity of a primary platform are possible as well without departing from the scope of the present disclosure. Note that a SPB identity of SP.ID 108a can comprise a value equivalent to the identity of a primary platform above (e.g. an ICCID, EID, UUID, or similar values).

The IDS server 103 could select or query for an image 106 for PP 101 using the PP-ID 101i received message 151. Note that form some embodiments, the PP-ID 101i could identify a class or group of PP 101 instead of uniquely identifying PP 101, where the class or group of PP 101 can be used to select an image 106 for PP 101. For these embodiments, the PP-ID 101i could specify a version or functions supported by PP 101. IDS 103 could send image maker 199 a message 152 in order to query or request the image 106 for device 102 using PP-ID 101i. Image maker 199 could send IDS 103 the image 106 for device 102 (or a plurality of devices 102) via a secure session in a message 153.

Although FIG. 1a depicts image maker 199 sending image 106 after IDS 103 receives TRE credentials, for some embodiments, an image maker 199 could send image 106 to IDS 103 before IDS receives data from device 102. IDS 103 could store and query for image 106 locally within IDS 103 or associated servers, potentially using PP-ID 101i. Other possibilities for the source and selection of a firmware 106 without departing from the scope of the present disclosure. For some embodiments, IDS server 103 could receive and record plaintext firmware 106 and encrypt the firmware 106 into ciphertext firmware 106* using a mutually derived symmetric ciphering key from a key exchange or key encapsulation mechanism (KEM). IDS 103 could send the ciphertext firmware 106* to device 102 in a message 154, where the message 154 can also include a manifest. The manifest can comprise the manifest as specified in the GP OFL document. The encryption and transmission of a firmware 106 from IDS 103 to device 102 with PP 101 could support the steps as depicted in the GP OFL document as well as the ETSI SSP Requirements document.

Figure 2A:
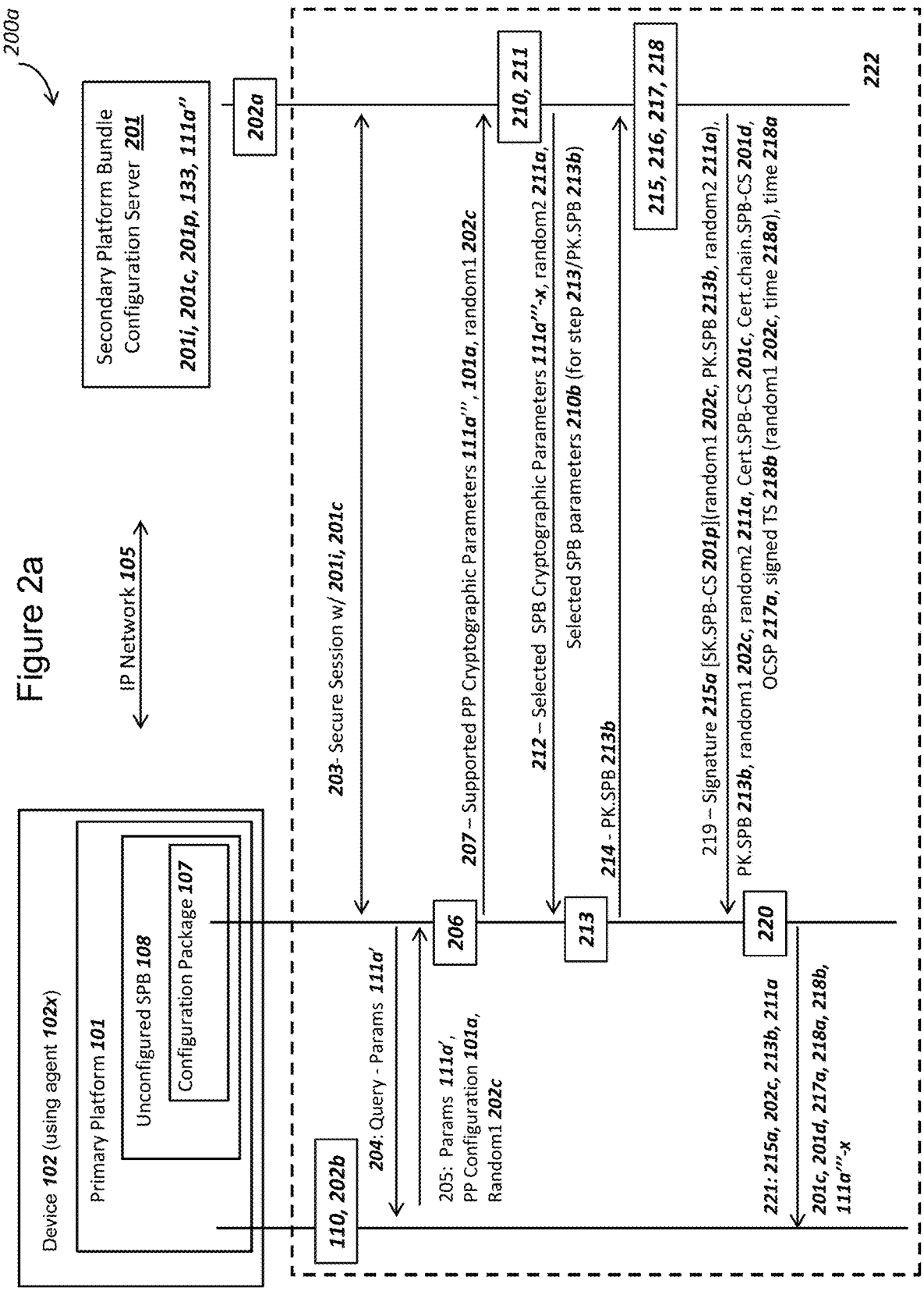
FIG. 2*a* is a simplified message flow diagram illustrating an exemplary system with exemplary data sent and received by (i) a device with a primary platform and unconfigured secondary platform bundle and (ii) a secondary platform bundle configuration server, in accordance with exemplary embodiments.

In exemplary embodiments, a device 102 can include the functional capabilities of (i) collecting sensor data from sensor 102f, (ii) changing state of an actuator 102z, (iii) communicating the data associated with a sensor or actuator with a wireless network, and/or receiving a challenge or nonce from a server and sending a digital signature. The device driver 102g, operating system 102i, and/or device program 102i could optionally be combined into an integrated system for providing the device 102 functionality. Other possibilities exist as well for the configuration or combination of components illustrated in FIG. 1a without departing from the scope of the present disclosure. In addition, the series of messages between device 102 sending message 151 with TRE credentials to server 103 and device 102 receiving encrypted firmware 106* from server 103 in a message 154 can comprise a step 110. The use of a step 110 is depicted in FIG. 2a below.

FIG. 1b

FIG. 1b is a graphical illustration of hardware, firmware, and software components for a device, including a tamper resistant element with a primary platform, in accordance with exemplary embodiments. FIG. 1b is illustrated to include several components that can be common within a "system on a chip" (SOC) 109 and a manufactured TRE 113 with a PP 101. In exemplary embodiments and as depicted in FIG. 1a above, device 102 can include and operate with the SOC 109, where SOC 109 can include a processor such as a central processing unit (CPU) or processor cores 109c.

Device 102 can include a manufactured SOC 109. SOC 109 can include separate components of external pads 109a, interface driver 109b, processor cores 109c, bus 109d, memory core interface 109m, nonvolatile memory 109s, and TRE 113. Although TRE 113 is depicted as operating in SOC 109, TRE 113 could also operate within a different component in device 102, such as physical interface 102a (in FIG. 1b above), where physical interface 102a could include a radio and a baseband processing unit. TRE 113 could also operate within a user interface 102d and other possibilities exist as well without departing from the scope of the present disclosure, including TRE 113 operating as a "stand alone" module or chip soldered to a circuit board for device 102. In other words, for some embodiments, TRE 113 could operate outside SOC 109 and within a different chip or component within a device 102.

The external pads 109a of SOC 109 can provide an electrical interface for SOC 109 to connect with bus 102d of device 102, such that the internal components of device 102 can communicate with the internal components of SOC 109, using a device driver 102g, which could comprise OFL and PP agent 102x. The external pads 109a can include pins or electrical contacts for electrical input into SOC 109 and such as a power voltage, electrical ground, a clock input, and data lines to communicate binary data. The external pads 109a can support electrical output from SOC 109 as well. Although not separately depicted in FIG. 1b, a TRE 113 could also include electrical connectors similar to external pads 109a in order to transfer electrical signals from TRE 113 to (i) SOC 109 or (ii) a bus within device 102 that connects the component or chip in which TRE 113 operates.

Interface driver 109b within SOC 109 can provide the firmware to support the selected physical bus type of both (i) bus 102d and internal bus 109d and (ii) a communications protocol for transferring data through the external pads 109a. The interface driver 109b can provide functionality similar to device driver 102g in FIG. 1a. For example, interface driver 109b could support multiple different bus types of a Serial Peripheral Interface (SPI) bus, an Inter-Integrated Circuit (I2C) bus, a memory bus, and other possibilities exist as well for data transfer using the driver 109b between processing cores 109c and device 102 using bus 102d, and other possibilities exist as well.

The processing cores 109c can comprise general purpose processing cores appropriate for typically low power consumption requirements for a device 102 (compared to a server 103), and may also function as a microcontroller. The processing cores 109c can include at least one processor core for device 102 such as an ARM® based processor or an Intel® based processor such as belonging to the Atom or Microprocessor without Interlocked Pipelined Stages (MIPS) family of processors, and other possibilities exist as well including exemplary Cortex-M processors and cores.

Internal bus 109d can comprise at least one data bus to connect the internal components of SOC 109, including TRE 113. Internal bus 109d can be a bus similar to bus 102d for device 102 as depicted and described in connection with FIG. 1b above. Although internal bus 109d is depicted as extending into TRE 113, in exemplary embodiments two separate data buses could be utilized, and the two busses connected via electrical connections for TRE 113 similar to pads 109a, where TRE 113 manages the data flow between the two busses using an interface controller 113a.

SOC 109 can also include a memory core interface 109m, where memory core interface 109m provides processor 109c and/or TRE 113 access to physical memory such as nonvolatile memory 109s and/or a RAM memory within SOC 109. RAM memory within SOC 109 and external to TRE 113 is not shown in FIG. 1b, but RANI memory similar to RANI 102e for device 102 could be included in SOC 109 and connected via internal bus 109d. Processor 109c and/or TRE 113 can read data from physical memory by writing an address of a memory page and/or block to memory core interface 109m, and memory core interface 109m returns the data from the page in physical nonvolatile memory 109s or a RAM memory for SOC 109 or TRE 113.

Similarly, processor 109c and/or TRE 113 can write data from physical memory by writing an address of a memory block and/or page to memory core interface 109m plus the data to be recorded in physical memory, and memory core interface 109m can subsequently write the data to physical memory at the block and page address specified. Other possibilities exist as well for the use of a memory core interface 109m without departing from the scope of the present disclosure. In exemplary embodiments, individual cells within a page can be addressed by a memory core interface 109m as well, and other possibilities for the structure and naming conventions of memory are possible without departing from the scope of the present disclosure.

Physical nonvolatile memory 109s can comprise memory similar or equivalent to nonvolatile memory 102s as depicted and described for device 102 above in FIG. 1a. Data recorded in memory 109s can remain stored in SOC 109 when power is removed from SOC 109. Although memory 109s is depicted as located within SOC 109, some memory cells recording data for SOC 109 could be located outside the physical housing of SOC 109 and/or TRE 113 and other memory cells recording data for SOC 109 could be located inside the physical housing of SOC 109. TRE 113 and processor cores 109c could access the physical nonvolatile memory 109s via a bus 109d and a memory controller 109m. In some exemplary embodiments, a memory controller 109m could operate with physical nonvolatile memory both (i) inside SOC 109 and (ii) outside SOC 109 and within device 102.

Physical nonvolatile memory 109s for SOC 109 can comprise at least a device read/write memory 109f and a TRE encrypted memory 109g. As noted in the paragraph above some data or memory allocations depicted in FIG. 1b as recorded in memory 109s in SOC 109 could be recorded or stored in nonvolatile memory 102s for device 102. Device read/write memory 109f can include an encrypted image 106* which could be downloaded in message 154 depicted in FIG. 1a above. Device read/write memory 109f can also be referred to as device memory 109f. Device memory 109f can also include general files for device 109i and free memory 109x. General files for device 109i can include files or data for the operation of device 102, such as data or libraries for device programs 102i, operating system 102h, and device drivers 102g. Free memory 109x can include unused or unallocated or free memory that is available for use by device 102 and/or TRE 113.

TRE encrypted memory 109g can comprise memory within nonvolatile memory 109s that includes data and/or files for TRE 113 that are encrypted and decrypted by TRE 113 using at least a symmetric ciphering key 127 and a memory controller 113k, where memory controller 113k is described in the paragraph below. Symmetric ciphering key 127 can comprise a sequence of pseudo-random digits unique for TRE 113 that are recorded in a read only memory or non-volatile memory for TRE 113 as shown in FIG. 1b within EEPROM 113c, although other possibilities exist as well for the location and format of a symmetric ciphering key 127 for TRE 113 without departing from the scope of the present disclosure, such as recording key 127 in iNVM 113s. TRE encrypted memory 109g can include ciphertext of the secondary platform bundle 108*, where ciphertext secondary platform bundle 108* can comprise a configured secondary platform bundle 108' that is encrypted with a symmetric ciphering key 127 for secure storage of SPB 108* in nonvolatile memory of device 102, such as memory 109s (depicted in FIG. 1b) or memory 102s (as shown in FIG. 1a).

Ciphertext of the SPB 108' which is depicted as SPB 108* can include the configuration data as shown for SPB 108' in FIG. 2b below. Thus, ciphertext SPB 108* can comprise firmware that is encrypted by TRE 113, managed by TRE 113, and fully operates for TRE 113 (such as conducting an authentication step 251 in FIG. 2b below). Ciphertext firmware 106* can comprise firmware that is encrypted by either an image maker 199 (in FIG. 1a above) or IDS 103, where the ciphertext firmware 106* can include an unconfigured SPB 108. In other words, the depiction of "*" in FIG. 1b can represent an SPB 108' that has been encrypted using the symmetric key 127. For some embodiments, TRE 113 can include sufficient memory for iNVM 113s such that the external storage of SPB 108' outside TRE 113 could be omitted.

Data recorded in nonvolatile memory 109g (or nonvolatile memory 102s) may be logically or physically separated from processor cores 109c and device 102 for reading and writing exclusively by TRE 113 through the use a memory controller 113k. Memory controller 113k can provide physical or logical isolation of TRE 113 and TRE encrypted memory 109g such that device 102 or SOC 109 could not feasibly read or write valid ciphertext data to memory 109g which could be subsequently read by TRE 113. For embodiments where TRE encrypted memory is physically separated from other memory for device 102 in SOC 109, encryption could be optionally omitted and the memory 109g could be referred to as "TRE only accessible memory" 109g.

As one example of physical separation of memory 109g, the physical memory in SOC 109 comprising non-volatile memory 109g could have a portion of the physical addresses reserved for reading and writing by TRE 113 only, such as an exemplary top 50 blocks of non-volatile memory 109g. Memory controller 113k could intentionally disallow the transfer of data from or to non-volatile memory 109g to (i) processors 109c or (ii) other components within SOC 109 or (iii) device 102 except for TRE 113, where the block address is in the exemplary top 50 blocks. Memory controller 113k could also operate on a lower level than a block address for non-volatile memory 109g as well, such as only allowing TRE 113 or processor 113b to allow a specified range of pages within non-volatile memory 109g, where the specified range of pages could belong to TRE encrypted memory 109g.

In this manner, memory controller 113k could operate as a firewall to restrict access for TRE encrypted memory 109g to TRE 113. Other possibilities exist as well for the operation of a memory controller 113k in order to isolate and separate "TRE only accessible memory" or TRE encrypted memory 109g such that processor cores 109c cannot feasibly utilize, read from, or write to physical memory addresses for recording and reading data utilized in "TRE only accessible memory" or "TRE encrypted memory" 109g. In addition, memory controller 113k and TRE 113 could utilize a memory bus 109q such that only (i) data encrypted by TRE 113 would be written to TRE encrypted memory 109g and (ii) data decrypted by TRE 113 could be feasibly read in plaintext form by TRE 113 using symmetric key 127. In other words, memory bus 109q could be a physical bus or a logical bus or circuit for TRE to access memory 109g. Memory bus 109q is not required in some exemplary embodiments, and memory controller 113k could be connected to data bus 109d, but limit access to physical memory cells comprising memory 109g to processor 113b. Other possibilities for limiting access to memory 109g to TRE 113 are possible as well without departing from the scope of the present disclosure.

In another embodiment, memory controller 113k could perform hardware-based encryption/decryption using a symmetric key 127 to encrypt and decrypt data transferred between TRE 113 and TRE encrypted memory 109g. In an exemplary embodiment, TRE encrypted memory 109g can be formatted with a file system with a separate partition from the memory that device 102 and SOC 109 accesses within memory 109f. A file system on TRE encrypted memory 109g could be encrypted using a symmetric ciphering algorithm from cryptographic algorithms 141 a symmetric key 127 recorded by TRE 113 (such as in iNVM 113s), such that even if TRE encrypted memory 109g could be accessed by device 102 or SOC 109, no useful data could be extracted or feasibly tampered with.

Although memory controller 113k is depicted in FIG. 1b as a separate element from memory core interface 109m, memory controller 113k could also be optionally integrated with memory core interface 109m, and other possibilities exist as well for the operation and location of a memory controller 113k for ciphering data or restricting access to data recorded in SOC 109 for TRE 113, without departing from the scope of the present disclosure.

SOC 109 or device 102 can include tamper resistant element (TRE 113). TRE 113 can also be referred to as a "secure element", "secure enclave", "secure environment", or also a trusted execution environment (TEE) or smart secure platform (SSP). As depicted in FIG. 1b, TRE 113 can comprise the physical hardware with components consisting of at least an interface controller 113a, a CPU 113b, memory controller 113k, RAM 113e, internal nonvolatile memory (iNVM) 113s, an internal bus 109d which could be segmented and a distinct subset of a bus 109d that is external to TRE 113 and internal to SOC 109, a hardware-based random number generator 128, a transducer 113z, and an Electrically Erasable Programmable Read-Only Memory (EEPROM) 113c. The connection of the subset of bus 109d inside TRE 113 and the external portion of bus 109d within SOC 109 could be managed by interface controller 113a.

TRE 113 can include a primary platform identity PP-ID 101i. PP-ID 101i could comprise a preferably unique alphanumeric or hexadecimal identifier for PP 101, such as a universal unique identifier (UUID), an International Mobile Equipment Identity (IMEI), an owner interface identifier in an IPv6 network, a serial number, or other sequence of digits to uniquely identify each of the many different possible units for PP 101 in a system 100 and other systems herein. PP-ID 101i can preferably be recorded in a non-volatile memory or written directly to hardware in TRE 113 by a TRE manufacturer upon TRE 113 manufacturing. For some embodiments, PP-ID 101i could comprise multiple portions, where a first portion uniquely identified PP-ID 101i, and a second portion identifies the version or capabilities of PP 101. Either (i) the first portion and the second portion could be transmitted in a message 151 in FIG. 1a, or (ii) just the second portion could be transmitted in a message 151 in FIG. 1a.

CPU 113b can comprise a processor embedded into the TRE 113 and consequently typically with less resources than processing cores 109c, such as (i) less cache memory, (ii) operating typically at a slower speed, (iii) fewer internal registers, (iv) lower power consumption due to reduced thermal dissipation for a TRE 113 compared to device 102, etc. For some exemplary embodiments, CPU 113b can comprise a processor with 32 bit wide datapaths (e.g. a "32 bit processor"), which processing cores 109c can comprise a processor with 64 bit wide datapaths (e.g. a "64 bit processor"). CPU 113b with interface controller 113a can also manage and sequence the flow of data between TRE 113 and the portion of the bus 109d extending to TRE 113. CPU 113b can also process other functions such as operating a set of cryptographic algorithms 141 recorded in boot firmware 121 or other cryptographic operations within a downloaded and/or operating firmware 106. CPU 113b could conduct the processing, computational, and logical steps for TRE 113 and PP 101 as depicted in FIG. 2a and FIG. 3 below, as well as other Figures herein. In exemplary embodiments CPU 113b processes instructions or machine executable code or byte code for the secondary platform bundle 108 and also the primary platform 101.

The processor 113b in TRE 113 can function similar to processor cores 109c for SOC 109 as described above. However, processor 113b can operate with a form factor, speed, and computational capacity suitable for TRE 113. Processor 113b in TRE 113 could be a processor belonging to the exemplary MIPS®, ARM®, or Intel® family of processors, and other possibilities exist as well. Processor 113b can include components such as registers, accumulators, and logic elements to add, subtract, multiply, and divide numerical values, and processor 113b can be connected to data bus 109d. The timing of processor 113b and data bus 109d can be driven by a clock, which could be either (i) operating internal to TRE 113 and connected to bus 109d or (ii) operating external to TRE 113 and input to TRE 113 via bus 109d. Processor 113b can provide the hardware for TRE 113 to perform calculations for cryptographic algorithms 141 in addition to the general operation of TRE 113 and managing communication between TRE 113 and SOC 109 through electrical connections similar to electrical pads 109a. Processor 113b could also be connected to internal bus 109q. When TRE 113 has received electrical power and loaded boot firmware 121 and boot configuration 123 from EEPROM 113c, then TRE 113 using processor 113b can operate as a primary platform 101.

EEPROM 113c could also comprise a read only memory, where the data in EEPROM 113c is written once upon manufacturing of SOC 109. EEPROM 113c could also function as a read only memory for TRE 113 similar to ROM 102c for device 102 above. In other words, EEPROM 113c does not need to be erasable and reprogrammable, although some data in EEPROM 113c could be re-written in exemplary embodiments. EEPROM 113c could comprise a non-volatile flash memory based on NAND or NOR memory cell technology, and other possibilities exist as well without departing from the scope of the present disclosure. The contents of EEPROM 113c will be discussed in additional detail below for this FIG. 1b. Although depicted as using EEPROM 113c, the data and elements depicted within EEPROM 113c in FIG. 1b could be alternatively stored in an internal nonvolatile memory (iNVM) 113s, where the memory within 113s is tagged or set as being "read only" during most of the life of operation of TRE 113. In other words, a physical EEPROM chip or memory cells are not required for some embodiments in order to implement the functionality of EEPROM 113c depicted in FIG. 1b.

Random access memory 113e in TRE 113 can function similar to RAM 102e for device 102, with a form factor, speed, and storage capacity suitable for TRE 113. RAM 113e can be connected to an internal data bus 109d in TRE 113 (where the internal data bus 109d in TRE 113 can be separate or distinct from the internal bus 109d outside TRE 113 and in SOC 109). RAM 113e and can store data for processor 113b in a volatile state, such that data recorded in RAM 113e can be essentially flushed or reset when electrical power to SOC 109 and TRE 113 is removed. Random access memory 113e can store data such as tables of memory addresses and sectors for memory 109g and memory 113s, since these tables are ordinarily larger than the registers provided by CPU 113b.

For some exemplary preferred embodiments, a TRE 113 could use persistent memory, known as nonvolatile RAM (NVRAM) for the equivalent functionality provided by RAM 102e. NVRAM can use transistor gate technology recording binary states within memory cells when electrical power is removed from TRE 113. NVRAM for memory 113s in TRE 113 and for PP 101 could use a memory chip supporting the memory technology commercially available in the Non-volatile Dual In-line Memory Module, persistent (NVDIMM-P) specifications as of 2019 (but not with the Dual In-line Memory Module (DIMM) physical form and rather in a specified silicon area for TRE 113 with capabilities for NVRAM technology). In exemplary embodiments, TRE 113 and PP 101 could use persistent memory for memory 113s, and thus obtain the benefits of faster read and write times (with lower power consumption) while also having the benefits of nonvolatile storage, such that firmware 106 could continue to be recorded in memory 113s when power is removed from TRE 113. In exemplary embodiments, the configured and encrypted SPB 108' after the conclusion of a step 249 in FIG. 2a, 122b can be stored within persistent memory 113s.

For some exemplary embodiments, although depicted as separate elements for both (i) processor cores 109c, and RANI 113e, and (ii) CPU 113e and RANI 113e, the two elements (processor and RAM) could comprise the same physical hardware but represent time division or time separation of the physical hardware, similar to how the same physical hardware can host multiple logical processes running concurrently. In other words, processor cores 109c could switch operations between a "normal" mode functioning as a CPU for device 102 and then a "secure" mode as TRE 113 for device 102. Or, CPU 113b could represent a virtualized process or computer within device 102, where the OS 102h implements virtualization and operates as a host for TRE 113. Switching could take place rapidly enough that processor 109c and TRE CPU 113b would appear to other components (both inside and outside device 102) as separate processors, while there could be a single physical processor inside device 102 such as within SOC 109.

As depicted in FIG. 1b, TRE 113 can include a transducer 113z, where transducer 113z could comprise a sensor and/or a radio. Transducer 113z can also be referred to as a radio 113z. Radio 113z could support near-field communication (NFC). Although illustrated as internal to TRE 113, radio 113z could be external to TRE 113 in some embodiments. A radio 113z that is external to TRE 113 but internal to SOC 109 could be connected via a secure bus such as bus 109d. In some embodiments, bus 109d can extend outside SOC 109 and/or TRE 113 in order to connect external components for SOC 109 with internal components for SOC 109 and TRE 113.

Radio 113z can comprise a radio for short-distance wireless communication, and be connected with an antenna. Radio 113z, when operating to support NFC communications, could (i) transmit and receive at the globally available frequency for unlicensed use of 13.56 MHz, and (ii) be compatible with the International Standards Organization (ISO) 14443 standards and subsequent and related versions. Radio 113z can operate as any of an NFC reader, NFC writer, and NFC peer-to-peer communication, and preferably supports communication at short range such as within several inches of SOC 109 and TRE 113. Radio 113z, when operating as an NFC radio, can support radio frequency communications with another NFC radio, when device 102 with SOC 109 is within close physical proximity of the other NFC radio, such as less than a few feet in an exemplary embodiment.

A benefit of the use of short-range communication for radio 113z is physical security, such that any external device desiring to communicate with TRE 113 through radio 113z must be in close physical proximity. In exemplary embodiments radio 113z could support other short-range wireless standards besides NFC. Radio 113z could implement radio frequency protocols that utilize low power and close proximity for the other node for which TRE 113 will communicate with. In exemplary embodiments, radio 113z could be a Bluetooth or WiFi radio, but operate at intentionally reduced in order to require closer physical proximity for an external device such as a mobile phone to communicate with TRE 113 using radio 113z. For embodiments where radio 113z operates as a Bluetooth or WiFi radio, radio 113z could transmit at a power in an exemplary range of 0.001-0.1 watts. Other possibilities for the radio technology and power levels of radio 113z exist without departing from the scope of the present disclosure.

TRE 113 can also include an embedded sensor for a transducer 113z. A sensor as a transducer 113z could comprise a sensor similar to sensor 102f for device 102, with a difference that a sensor for transducer 113z can be sufficiently small to be enclosed by the housing for TRE 113 along with the other components illustrated in FIG. 1b. In exemplary embodiments the analog output of a sensor for transducer 113z can be converted to digital form by CPU 113b and utilized as input, along with other data, into a random number seed 128b within random number generator 128 in TRE 113. A sensor for a transducer 113z could collect analog data, such as temperature, pressure, thermal noise in silicon within TRE 113, or other environmental variables, with a sufficient number of significant digits, such that the trailing digits could comprise an effective noise value. The noise value from a transducer 113z could be averaged or accumulated over time in order to increase the information entropy of the noise value. Or, the combination of many different measurements by a sensor as transducer 113z could comprise an essentially random value or a number with enough randomness for use with cryptographic operations.

As illustrated in FIG. 1b, TRE 113 and SOC 109 may also contain a random number generator 128. Random number generator 128 can comprise a physical component that generates random or pseudo random numbers for cryptographic operations of TRE 113 and PP 101. A random number generator 128 can also comprise a hardware random number generator. The creation of random numbers with a high degree of entropy is important in the use of subsequent steps such as generating a value for SK.SPB 213a. Or, random numbers from random number generator 128 could be used with the creation of nonce values or challenge values for use with digital signatures. Random number generator 128 can be used to create random number random1 202c as depicted and described in connection with FIG. 2a below.

Random numbers from random number generator 128 could be used to create a symmetric ciphering key 127, and other possibilities exist as well. A seed 128b for random number generator 128 could comprise a plurality of data from within TRE 113 appended together in order to accumulate information entropy. To acquire the seed 128, TRE 113 could collect a plurality of transducer 113z measurements or states, radio 113z measurements, clock times or values for CPU 113b, RAM 113e or memory 109g states, etc. In exemplary embodiments, random number generator 128 can include a secure hash algorithm operating on the random number seed. In exemplary embodiments, random number generator 128 operates within TRE 113 as depicted in FIG. 1b, and in this manner the random numbers used for cryptographic operations such as PKI key generation for the secret or private key for SK.SPB 213a can remain reasonably secure and not normally communicated outside TRE 113. Random number generator 128 could also be used to derive PKI keys for TRE in support of the operation of a firmware 106, where firmware 106 could conduct cryptographic operations for an application on device 102.

EEPROM 113c in TRE 113 can include a PP certificate 120, PP boot firmware 121, CU boot configuration 123, certificate authority public key 133, certificate authority public key parameters 111a', a primary platform private key 115a, and a symmetric key 127. PP private key 115a and symmetric key 127 can be recorded in a protected memory 125 in nonvolatile memory 113c, similar to TRE only accessible memory 109g, such that (i) only TRE 113 can read PP private key 115a using instructions in PP boot firmware 121 or firmware 106, and (ii) PP private key 115a may not be read by device 102 or transferred out of TRE 113 in exemplary embodiments. In exemplary embodiments, PP boot firmware 121 or firmware 106 can omit instructions that would allow PP private key 115a to be transferred to electrical pads 109a.

Note that PP private key 115a could be used for digital signature operations by TRE 113 and primary platform 101, and key 115a can be different than or the same as a primary platform private key used for downloading firmware 106 from IDS 103. By recording the keys in EEPROM 113c during manufacturing, the values can be fixed and TRE 113 can be reasonably assured about the security and integrity of these keys during operation.

Data within EEPROM 113c can comprise PP certificate 120, PP boot firmware 121, PP boot configuration 123, certificate authority public key 133, and certificate authority public key parameters 111a'-x. Data can be written to EEPROM 113c by a TRE configuration unit during manufacturing of TRE 113. The data in EEPROM 113c for TRE 113 can be written into EEPROM 113c in TRE 113 and SOC 109 before SOC 109 is distributed to a manufacturer of device 102. PP certificate 120 can be written to EEPROM 113c by a TRE configuration unit (i) after the generation of PP private key 115a, and (ii) after the signature of the corresponding PP public key 115b by a certificate authority.

PP certificate 120 can include the PP identity PP-ID 101i, PP public key 115b (corresponding to PP private key 115a), certificate parameters 111a'-x, and a certificate authority digital signature 116. PP certificate 120 can be formatted according to the X.509 v3 specifications, among other possible formats, and stored as a plain text file, *.pem file, or *.crt file or similar file formats. PP certificate 120 can be used by TRE 113 and SOC 109 in order to (i) verify identity of TRE 113 to device 102 or a server such as server 103 (including verifying identity of TRE 113 to a network), or (ii) generate a digital signature for an internally generated or derived PKI key pair, such as PK.SPB 213b. In exemplary embodiments, parameters 111a'-x in PP certificate 120 can include an expiration time of PP certificate 120 longer than the expected operational lifetime of TRE 113, and in this manner PP certificate 120 can remain valid whenever SOC 109 is utilized. An exemplary expiration time of PP certificate 120 could be 25 years, although other possibilities exist as well.

PP boot firmware 121 in EEPROM 113c can provide machine executable code for processor 113b to initiate operations when electrical power is provided to TRE 113 and SOC 109 via the electrical pads 109a. Although not illustrated in FIG. 1b, processor 113b may also include a ROM memory with CPU-113b instructions for CPU-113b to fetch PP boot firmware 121 upon startup when power is provided to CPU-113b. In exemplary embodiments, PP boot firmware 121 could comprise a "Primary Boot Loader" as contemplated by the GSMA PP requirements document, and other possibilities exist as well. PP boot firmware 121 can include a set of cryptographic algorithms 141, described in the paragraph below, and memory control libraries 122. PP boot firmware 121 in EEPROM 113c could also include instructions for TRE 113 to decrypt and load a SPB 108* recorded in non volatile memory 109g into memory 113s or 113e, where a plaintext SPB 108' can comprise an operating image or application for the operation of primary platform 101. In other words, PP boot firmware 121 can launch an operating system for PP 101, where the OS for PP 101 could operate as a host for the configured SPB 108'. Although TRE 113 with PP 101 depicts SPB 108' as loaded and operating within a RAM memory 113e, for some embodiments the SPB 108' could be loaded into nonvolatile memory 113s.

Cryptographic algorithms 141 in memory 113c can comprise digital signature algorithms such as Elliptic Curve Digital Signature Algorithm (ECDSA) or Digital Signature Algorithm (DSA), symmetric ciphering algorithms such as Advanced Encryption Standard (AES) and Triple Data Encryption Standard (3DES), key exchange algorithms, key pair generation algorithms, random number generators, secure hash algorithms such as SHA-2 or SHA-3, and asymmetric ciphering algorithms such as El gamal or Rivest-Shamir-Adleman (RSA). Cryptographic algorithms 141 in memory 113c can include algorithms supporting post-quantum cryptography such as code-based, lattice-based, and multivariate-based algorithms for both key exchange mechanisms (KEM) and processing digital signatures. Libraries in cryptographic algorithms 141 could be from standard open source libraries such as OpenSSL, crypto++, Bouncy Castle, or Mozilla libraries from Network Security Services, and other possibilities exist as well. Example calculations and functions from the use of cryptographic algorithms 141 are depicted and described in connection with FIG. 2a and FIG. 2b below.

In exemplary embodiments, ciphertext SPB 108* could be decrypted with a symmetric key 127 recorded in EEPROM 113c or iNVM 113s. The symmetric key 127 also could be derived by TRE 113 and stored within nonvolatile memory 113s. Note that TRE 113 could use multiple different values for symmetric key 127, such that a first key 127 is used with a first SPB 108* (which could be provided by a TRE 113 manufacturer) and a second key 127 could be derived by TRE 113 for encrypting storing subsequently downloaded firmware 106 as a second SPB 108* in memory 109g. In exemplary embodiments, a symmetric key 127 for TRE 113 will be unique for each different SOC 109 and also SPB 108*, and each symmetric key 127 can be uniquely associated with a PP-ID 101i and ID-SP 108a.

In exemplary embodiments, the ID-SP 108a is stored within SPB 108* external to ciphertext (such as in plaintext metadata for the ciphertext SPB 108*), and the symmetric key 127 for decrypting the SPB 108* can be selected by TRE 113 using the ID-SP 108a. In other words, a non-volatile memory iNVM 113s can store a plurality of symmetric keys 127 each with a corresponding ID-SP 108a. The specific symmetric key 127 for decrypting the SPB 108* can be selected by TRE 113 by matching or associating the ID-SP 108a in metadata for SPB 108* with the ID-SP 108a in iNVM 113a associated with the symmetric key 127. In some exemplary embodiments, SPB 108' is not required for TRE 113 to operate, and TRE 113 could operate using PP boot firmware 121 in order to communicate with a IDS 103 through agent 102x and download firmware 106.

Memory control libraries 122 could include software or firmware to manage and schedule the operation of TRE 113, such as machine code for (i) instructing processor 113b to write data to bus 109q for memory controller 113k when data is recorded in memory 109g, (ii) read data from bus 109d when data from SOC 109 is passed to TRE 113, (iii) reading PP private key from protected memory 125 cryptographic algorithms 141 for TRE 113 need the private keys for cryptographic operations such as a key exchange, KEM, or digital signatures. Memory control libraries 122 can include the software libraries and firmware for processor 113b to manage all input and output of TRE 113, including embodiments where TRE operates as a separate component connected to bus 102d and separate from SOC 109. Other possibilities exist as well for memory control libraries 122 to support the operation of TRE 113 and SOC 109 via program instructions provided to processor 113b without departing from the scope of the present disclosure. Note that memory control libraries 122 could also allow PP 101 to operate multiple different firmware 106 or secondary platform bundles 108' concurrently, such as for encapsulating and isolating data for each firmware 106, such that different firmware 106 could not read or write to data within TRE 113 that does not belong to the firmware 106.

Memory control libraries 122 can also include PP read instructions 161 and PP write instructions 162. PP read instructions 161 can provide machine executable code for processor 113b to read data from device 102 and/or SOC 109 using a data bus 109d or bus 109q. PP read instructions 161 can provide the read libraries for firmware 106 or secondary platform bundle 108' to call in order for firmware 106 (or firmware 116) to read data from physical memory within TRE 113. The data read from physical memory by PP read instruction 161 for a firmware 106 or SPB 108' or uSPB 108 could be used with cryptographic algorithms 141 by TRE 113. In this manner, PP read instructions 161 could provide both (i) the logical software or firmware interface for TRE 113 to receive data from device 102 and (ii) isolate data for different firmware 106 or SPB 108' operating in PP 101. PP write instructions 162 can comprise executable code for processor 113b to write data to device 101 or SOC 109 for SPB 108' or uSPB 108 in a manner corresponding to PP read instructions 161.

PP read instructions 161 could specify memory addresses or file locations in a file system for non-volatile memory 109s or memory 113s or memory 113e. For example, PP read instructions 161 could be used by PP 101 for data in memory 109s where device 102 can write data in order to be read by TRE 113. In an exemplary embodiment, (i) device 102 could write a file with an exemplary name "firmware_update_version_1.5" (which could comprise ciphertext firmware 106*) to a specified location in device memory 109f. Then, after commands from agent 102x, (ii) PP read instructions 161 could instruct processor 113b to read the image 106* data and subsequently process the image 106* data with firmware decryption.

PP read instructions 161 could also specify shared registers or memory addresses for PP 101 where either (i) an unconfigured secondary platform bundle (uSPB) 108 or (ii) configured SPB 108' stores data in a protected memory for PP 101 and processor 113b to receive data from uSPB 108 or SPB 108'. PP write instructions 162 could also specify shared registers or memory addresses for PP 101 where either (i) an unconfigured secondary platform bundle (uSPB) 108 or (ii) configured SPB 108' reads data from a protected memory for PP 101 and processor 113b to send data to uSPB 108 or SPB 108'.

EEPROM 113c in TRE 113 for SOC 109 can also include a PP boot configuration 123, a certificate authority public key 133, certificate authority public key parameters 111a'-x, a PP private key 115a and a symmetric key 127. PP boot configuration 123 can provide values for the configuration or operation of TRE 113 when operating with the PP boot firmware 121, such as specifying (i) the frequency to operate a bus 109d for data input SOC 109 or device 102, (ii) the frequency to operate a processor 113b as well as processor configuration settings, (iii) a boot firmware version number, (iv) the memory capacity or allocated memory blocks or ranges of memory 109g for TRE 113 or iNVM 113s, and (v) parameters specifying values for hardware within TRE 113 or radio/transducer 113z.

Certificate authority (CA) public key 133 can be utilized by TRE 113 to verify digital signatures received where the digital signature was generated and signed with a CA private key, such as a certificate for a server. CA public key parameters 111a'-x can specify the parameters for using the CA public key 133, where parameters 111a'-x can be a subset of the parameters supported by cryptographic algorithms 141. Exemplary parameters 111a' are depicted and described in connection with FIG. 1c below, such as specifying a key length, digital signature algorithm 111d and secure hash algorithm 111e to utilize, etc. Note that parameters 111a'-x for CA public key 132 and parameters 111a'-x for a PP static public key of PK.PP 115b and/or PP private key 115a can be different.

Although a single CA public key 133, PP private key 115a, symmetric key 127, and PP certificate 120 is depicted in FIG. 1b, an EEPROM 113c or SOC 109 could record a plurality of each of these and associated elements. For example TRE 113 could record two different private keys 115a in EEPROM 113c, where a first private key 115a is used with asymmetric ciphering algorithms (such as El Gamal based encryption or a PQC KEM) and a second private key 115a is used with digital signature algorithms. Each of the first and second private keys could have a corresponding public key 115b, and consequently two different PP certificates 120 (each with a different public key 115b) could be recorded in an EEPROM 113c. CA public key 133 could also be used with asymmetric ciphering algorithms in 141, such that TRE 113 could encrypt data using the CA public key 133 and the certificate authority could subsequently decrypt the encrypted data using the CA private key corresponding to the CA public key 133.

In exemplary embodiments, initial PKI keys for SOC 109 may be recorded in EEPROM for TRE 113 as shown in FIG. 1b, and subsequent or updated versions of the keys can be recorded in memory 109g or memory 113s. Certificate Authority (CA) Public Keys 133 can also record a set of root certificates for TRE 113 and SOC 109 to use with verification of certificate authority digital signatures for certificates such as a configuration server certificate 201c. Root certificates recorded in CA public keys 133 can comprise the list or a subset of the list of included root certificates from the Mozilla Foundation with Mozilla projects, where the aggregate list of community approved root certificates and associated parameters is in the widely distributed file certdata.txt from the Mozilla web site.

TRE 113 can include internal nonvolatile flash memory iNVM 113s, which can also be referred to as "nonvolatile memory 113s" or "memory 102s". In other words, for some embodiments, nonvolatile memory 113s can comprise a dedicated portion of device nonvolatile memory 102s that is allocated to TRE 113. CPU 113b can read and write to the dedicated portion of device nonvolatile memory 102s and processor cores 109c can be disabled from reading or writing to the dedicated portion of nonvolatile memory 102s. Nonvolatile memory 113s can comprise a physical memory of NAND or NOR flash memory, or other nonvolatile memory types including a persistent memory or non-volatile random access memory (NVRAM), such that data stored or written by TRE 113 to nonvolatile memory 113s continues to be stored or recorded when electrical power is removed from device 102 or SOC 109 or TRE 113. The data within non-volatile memory 113s can subsequently be read and other data re-written when power is restored to TRE 113. Some components of a plaintext firmware 106 or SPB 108' for TRE 113 can be stored in memory 113s, such as cryptographic keys including private keys such a long-term secret shared key K for 5G networks or 4G networks, an identifier for device 102 with a 3GPP or ETSI wireless network such as an international subscriber identity (IMSI) or subscriber permanent identity (SUPI).

In exemplary embodiments, the wireless network could also record the key K in an authentication center or authentication credential repository and processing function (ARPF) in order to conduct an authenticated key agreement (AKA) key exchange between the wireless network and device 102, where device 102 records and operates with the key K and identity information in TRE 113. Other keys from a firmware 106 could be recorded in iNVM memory 113s as well including private keys such as a private key of the eUICC for creating signatures comprising a key SK.EUIC-C.ECDSA. Other possibilities exist as well for private keys described in the present disclosure to be stored or recorded in an internal nonvolatile memory iNVM 113s for a TRE 113 without departing from the scope of the present disclosure.

In exemplary embodiments, the PP boot firmware 121 contains drivers and libraries for the device 102 system bus 102*d* and physical interface 102*a* (which could be a 4G LTE or 5G radio module or equivalent), such that PP 101 can control the physical interface 102*a* and transmit/receive data independent of a general processor 109*c*. In this manner, PP 101 using PP boot firmware 121 can pre-empt or "override" other processes running in OS 102*h* for device 102. In other words, if malware or other software within device 102 attempts to prevent PP 101 from communicating through physical interface 102*a*, PP 101 can have priority access over any process within processor 109*c*, such that PP 101 can communicate outside of device 102, such as to a configuration server 201 in FIG. 2*a* below. In this manner, malware or misconfigured software within device 102 would not prevent PP 101 from communicating with external server and obtaining firmware such as a secondary platform bundle 108. For some embodiments, the secondary platform bundle 108 can include anti-virus software in order to detect, remove, and/or contain malware operating in device 102 via processor 109*c*.

FIG. 1*c*

FIG. 1*c* is an illustration of an exemplary set of cryptographic parameters for a primary platform and a secondary platform bundle, in accordance with exemplary embodiments. Cryptographic parameters 111 can specify sets of cryptographic parameters for cryptographic algorithms that are supported by primary platform 101, a secondary platform bundle 108, and a configuration server 201 (depicted in FIGS. 2*a* and 2*b* below), in order to support the systems and methods herein. Cryptographic parameters 111 or subsets thereof can be recorded in nonvolatile memory in each of PP 101, SPB 108, and configuration server 201. Cryptographic parameters 111 can include values for an identification of set identifier 111*a*, a key length 111*b*, a type or name 111*c*, a signature algorithm 111*d*, a secure hash algorithm 111*e*, a key exchange mechanism 111*f*, and a timestamp authority certificate Cert.TS 111*g* for each of the different the parameters 111*a*. Although not depicted for cryptographic parameters 111 in FIG. 1*c*, the cryptographic parameters 111 could also specify values or settings for a symmetric ciphering algorithm such as a symmetric ciphering key length, settings for a symmetric ciphering algorithm, and a random number length used to create random numbers, padding schemes, encoding rules such as Distinguished Encoding Rules (DER), Basic Encoding Rules (BER), etc.

FIG. 1*c*

As contemplated herein, when a selected set of cryptographic parameters such as using the words or description "parameters 111*a*" or "cryptographic parameters 111*a*" can specify a row of parameters or values in a set of cryptographic parameters 111, such that the collection of values in the row can be used with key pair generation functions to derive PKI keys (e.g. in steps 213 below), an ECDH key exchange or PQC KEM to mutually derive a shared secret, a key derivation function to derive a symmetric ciphering key using at least a shared secret, and a digital signature algorithm for both (i) generating digital signatures with a private key and (ii) verifying digital signatures with a public key.

Set identifier 111*a* can be an identity for a row or set of values for cryptographic parameters 111. Set identifier or group or subset 111*a*' could represent a first set of cryptographic parameters supported by primary platform 101 (which is also depicted and described for a primary platform 101 in FIG. 1*b*). Set identifier or group or subset 111*a*'' could represent a second set of cryptographic parameters supported by a secondary platform bundle 108, such as available to or used by an SPB OS 108*h*. As depicted in FIG. 1*c*, the subset 111*a*''' can comprise the mutually supported set of cryptographic parameters for both PP 101 and SPB 108. PK key length 111*b* could represent the length of a public key in bits or bytes. Parameters 111 could include the length of a private key in bits or bytes as well.

The type or name 111*c* for a set of cryptographic parameters 111 can specify the cryptographic algorithms to use with PKI keys, such as the exemplary names for ECC curves and also post-quantum cryptography cryptographic algorithms. The field of post-quantum cryptography continues to develop with proposed algorithms currently undergoing revisions for standardization as of October 2019. In general, the leading candidates for post-quantum cryptography key exchange mechanisms propose using (i) lattice-based cryptography, (ii) code-based cryptography, or (iii) Supersingular elliptic curve isogeny cryptography, as described by the Wikipedia article for "Post-Quantum Cryptography" dated Feb. 22, 2019, which is hereby incorporated by reference. The type 111*c* for cryptographic parameters 111 can specify an ECC named curve, a post-quantum cryptography cryptographic algorithm, or RSA based algorithms for PKI keys used with the type 111*c* for PKI keys using or associated with the type.

For use of ECC algorithms within a type 111*c*, parameters 111 can specify elliptic curve names such as, but not limited to NIST P-256, sect283k1, sect283r1, sect409k1, sect409r1, and other possibilities exist as well. Further, elliptic curves that do not depend on curves currently specified by the National Institute of Standards and Technology (NIST) could be utilized as well, such as, but not limited to, Curve22519, curve448, or FourQ. Parameters 111 can specify domain parameters for elements in system 100 to calculate values or numbers in a compatible manner, such as (i) a common base point G for use with ECC PKI key pairs and (ii) a defining equation for an elliptic curve. Parameters 111*a* can also specify settings to use with (i) a set of cryptographic algorithms 141 as depicted and described in connection with FIG. 1*b* above or (ii) the set of cryptographic algorithms for SPB OS 108*h*.

Signature algorithm 111*d* for a set of cryptographic parameters 111 can specify the digital signature algorithm used with the PKI keys for a selected subset of cryptographic parameters 111*a*. Exemplary signature algorithms include ECDSA, Dilithium, Great Multivariate Short Signature (GeMSS), qTesla, DSA, and other possibilities exist as well. For example, the signature algorithm 111*d* in an operating set of cryptographic parameters 111*a*'''-x could specify the signature algorithm used by PP 101 in a step 237 in order to generate digital signature 237*a*, as well as the signature algorithm for configuration server 201 (in FIGS. 2*a* and 2*b* below) to use in order to generate a digital signature 215*a* in a step 215. Other possibilities for signature algorithms 111*d* and types 111*c*, as well as key lengths 111*b* are possible as well without departing from the scope of the present disclosure.

Hash algorithm 111*e* in cryptographic parameters 111*e* can be the name of a secure hash algorithm, such as the exemplary SHA-256 algorithm depicted, which may also be referred to as "SHA-2". Although not depicted in FIG. 1*c*, settings for a symmetric ciphering algorithm in cryptographic parameters 111 can specify (i) the identity or name of a symmetric ciphering algorithm such as "AES", "AES-SIV", 3DES, Blowfish, etc, and (ii) settings for the symmetric ciphering algorithm. Other possibilities exist as well for data within cryptographic parameters, such as the specification of point compression, encoding rules such as distinguished encoding rules (DER), Abstract Syntax Notation (ASN) or Concrete Syntax Notation (CSN) syntax notation, padding rules, byte or bit orders such as big endian, little endian, etc.

Key exchange 111f can specify a key exchange algorithm used with the PKI keys for a set of cryptographic parameters 111a. Exemplary exchange algorithms can include an ECDH key exchange using the type 111c. Key exchange 111f could also support other key encapsulation mechanisms (KEM) such as those for post-quantum cryptographic algorithms depicted as "KEM". The specific steps for a key exchange can be specified according to the type 111c. In general a key exchange mechanism or key exchange 111f can comprise using a public key from a remote entity and a local private key in order to derive a shared secret. The key exchange mechanism could also comprise encrypting a symmetric ciphering key with a public key and decrypting the symmetric ciphering key with a private key. Other possibilities exist as well for a key exchange 111f in parameters 111 in order to select or specify the use of cryptographic algorithms without departing from the scope of the present disclosure. Cryptographic parameters 111 can also include a timestamp authority (TSA) certificate 111g for different members of the set of cryptographic parameters, where the TSA certificate 111g could use the associated parameters such as type 111c.

Cryptographic parameters 111 can also be associated with the use of public keys and certificates by both a primary platform 101 and a secondary platform bundle 108. Thus, the parameters 111 specified above can identify or be associated with cryptographic algorithms to use, such as (i) a first set of cryptographic algorithms 141 within a primary platform 101 and (ii) a second set of cryptographic algorithms 141 used by SPB 108 in SPB OS 108h. An operating system 108h or SSP app 108d within a SPB 108 could record cryptographic algorithms 141 that could implement the parameters 111a". As depicted in FIG. 1c, parameters 111 as contemplated herein may also identify or be associated with public keys and certificates. Note that the public keys and certificates for a set of cryptographic parameters 111a could use the values for the cryptographic parameters 111a, such as a public key having a length of 111b and type of 111c and a certificate could use a signature algorithm 111d with a hash algorithm 111e.

Each set of cryptographic parameters 111a' for a primary platform 101 can include a primary platform public key PK.PP 115b, a primary platform certificate Cert.PP 120, a certificate chain for the primary platform of Cert.CA-chain.PP 131, and a certificate authority root certificate Cert-root.CA 133. The primary platform public key PK.PP 115b and the primary platform certificate Cert.PP 120 were also depicted and described in connection with FIG. 1b above. The certificate chain for the primary platform of Cert.CA-chain.PP 131 can comprise a chain of certificates from the primary platform certificate Cert.PP 120 through a certificate issuer root certificate Cert-root.CA 133. In exemplary embodiments, the certificate chain of primary platform 101 can include multiple intermediate certificates between Cert.PP 120 and root certificate Cert-root.CA 133.

Each set of cryptographic parameters 111a" for a secondary platform bundle 108 can include a secondary platform bundle configuration server SPB-CS public key PK.SPB-CS 201ca, a secondary platform bundle configuration server certificate Cert.SPB-CS 201c, a certificate chain for the secondary platform of Cert.CA-chain.SPB-CS 201d, and a certificate authority root certificate Cert-root.CA 133. The secondary platform configuration server public key PK.SPB-CS 201ca and the secondary platform bundle configuration server certificate Cert.SPB-CS 201c are also depicted and described in connection with FIG. 2a and FIG. 2b below. The certificate chain for the secondary platform of Cert.CA-chain.SPB-CS 201d can comprise a chain of certificates from the secondary platform bundle configuration server certificate Cert.SPB-CS 201c through a certificate issuer root certificate Cert-root.CA 133. In exemplary embodiments, the certificate chain of primary platform 101 (e.g. Cert.Chain-CA.PP 131) can include multiple intermediate certificates between Cert.PP 120 and root certificate Cert-root.CA 133.

Cryptographic parameters 111 used by a primary platform 101, secondary platform bundle 108, and configuration server 201 could include a subset of mutually supported cryptographic parameters 111a'''. In other words the mutually supported cryptographic parameters 111a''' could be an overlapping subset of the parameters 111a' supported by primary platform 101 and the parameters 111a" supported by SPB 108. Within the subset of mutually supported cryptographic parameters 111a''', a configuration server 201 or SPB 108 could select an operating set of cryptographic parameters 111a'''-x, which could comprise the preferred cryptographic parameters 111 to use from the subset of mutually supported cryptographic parameters 111a'''. As depicted in FIG. 1c, in exemplary embodiments, the selected operating set of cryptographic parameters 111a'''-x could include the same certificate authority root certificate 133 for both the PP 101 and SPB 108.

Different root certificates for the same set of cryptographic parameters 111a are depicted as 133', such that two root certificates could support the parameters shown, but the root certificates could be from different certificate issuers or certificate authorities. Thus, as depicted in FIG. 1c, the SPB 108 and PP 101 could record or store the same root certificate 133-3 for the set of parameters "3" (e.g. third row). However, although other shared parameters could be equal for SPB 108 and PP 101 for the set of parameters "4" (e.g. fourth row), the root certificate for PP 101 could be Cert-root.CA 133-4 and the root certificate for SPB 108 could be a different root certificate (with those parameters) of Cert-root.CA 133-4', and thus PP 101 could store a different root certificate than SPB 108 for the certificate issuer root certificate 133 that support the parameters 111a.

In addition, for exemplary embodiments, a selected set of parameters 210b could be selected for use by a SPB 108 that is different than supported parameters 111a' for a primary platform 101, as depicted in FIG. 1c. An SPB 108 could use the parameters 210b with cryptographic algorithms in an SPB OS 108h in order to use cryptographic algorithms and parameters that are not natively supported by a primary platform 101 (e.g. the parameters and algorithms may not be supported by cryptographic algorithms 141 for a PP boot firmware 121 or operating system in PP 101). This increases flexibility of systems 200a and 200b below, such that new cryptographic algorithms such as a type 111c could be used by a TRE 113 in a secondary platform bundle 108' after the manufacturing and deployment of PP 101 within devices 102 (where PP boot firmware 121 may not support parameters 210b), which is important for the long-term security of devices 102. As one example, PP 101 could be deployed with cryptographic algorithms 141 that support classical cryptography such as Diffie-Hellman, Elliptic Curve Diffie Hellman, and/or RSA from PP boot firmware 121, but then support for PQC algorithms for device 101 such as the exemplary parameters 210b from a step 210 below could be later added or supported in a configured secondary platform 108'. For some embodiments, the secure authentication of public keys derived by a SPB 108 in a PKI key generation step using parameters 210b can depend on the pre-existing, supported parameters 111a' and selected operating parameters 111a'''-x for PP 101.

FIG. 2a

FIG. 2a is a simplified message flow diagram illustrating an exemplary system with exemplary data sent and received by (i) a device with a primary platform and unconfigured secondary platform bundle and (ii) a secondary platform bundle configuration server, in accordance with exemplary embodiments. System 200a can include a device 102 and a secondary platform bundle configuration server (SPB-CS) 201 communicating through an IP network 105. As contemplated herein, the secondary platform bundle configuration server (SPB-CS) 201 can also be referred to as configuration server 201. Device 102 and components in device 102 were depicted and described in connection with FIG. 1a and FIG. 1b above. Although a single device 102 and server 201 are depicted in FIG. 2a, a system 200a could include a plurality of each of the devices and servers shown.

In exemplary embodiments, a Secondary Platform Bundle Manager (SPBM) as described in the SSP Requirements document could operate a configuration server 201. Systems 200a and 200b support a need in the art for a configuration server 201 to securely configure a SPB 108. Although the download of firmware 106 in a system 100 can support mutual authentication of the PP 101 and an image delivery server 103, a second, different entity could operate the configuration server 201 after the download of firmware 106, and the configuration server 201 can preferably support configuration of SPB 108 in a manner where PP 101 operating SPB 108 and the configuration server 201 can be mutually authenticated, in order to address the needs in the art as described above.

Device 102 can include a primary platform 101 as depicted in FIG. 2a, along with the other components for a device 102 depicted in FIG. 1a and a primary platform 101 within a TRE 113 depicted and described in connection with FIG. 1b. The primary platform 101 could decrypt encrypted firmware 106* from IDS 103 and load the firmware 106 into memory of TRE 113. The loaded firmware could comprise an unconfigured secondary platform bundle (uSPB) 108 and a configuration package 107. In exemplary embodiments as depicted in FIG. 2a, the configuration package 107 and/or uSPB 108 can communicate with a host primary platform 101. For example, PP 101 could support a logical interface allowing a uSPB 108 or configured SPB 108' to query PP 101 for supported parameters 111a' of PP 101, where the supported parameters 111a' of PP 101 could be implemented in cryptographic parameters 141 as depicted and described in connection with FIG. 1b. PP 101 could also support a logical or memory interface for a uSPB to send a message 221 for PP 101 to generate a digital signature using the data in message 221.

At step 202a, configuration server 201 could record values or settings for (i) the secure communication with PP 101 through device 102 and (ii) a program equivalent to device program 102i in order for configuration server 201 to convert an uSPB 108 into a configured SPB 108'. The data could include an identity for configuration server 201 to use of ID. SPB-CS 201i such as a domain name, a web server such as Apache or IIS that support secure sessions such as TLS, a certificate of CS 201 of Cert. SPB-CS 201c along with the corresponding private key 201p as well as a preferred list of parameters 111a'' available to a uSPB 108 or configured SPB 108'. CS 201 could also record at least one certificate authority root certificate 133. Additional data could be recorded by a CS 201 in a step 202a without departing from the scope of the present disclosure. CS 201 could also record a plurality of each of the values for 201c, 201p, and 133 for different sets of cryptographic parameters 111a supported by CS 201. In exemplary embodiments, CS 201 could support and operated with the set of parameters 111a'' for a SPB 108, where the set of parameters 111a'' is depicted and described in connection with FIG. 1c.

Device 102 could conduct a step 110 in order to securely download the firmware 106 from an image delivery server 103, where the step 110 was depicted and described in connection with FIG. 1a above. Device 102 using PP 101 could conduct a step 202b in order to decrypt firmware 106 and verify a digital signature for firmware 106 from image maker 199 or IDS 103 that firmware 106 is authorized and authenticated for PP 101. Step 202b can include PP 101 loading and launching the configuration package 107, which could be included in firmware 106. In exemplary embodiments, the configuration package 107 in a step 202b could be loaded from NVM 113s into RAN1 113e within TRE 113 as depicted and described in connection with FIG. 1b above. As depicted in FIG. 2a, the PP 101 can include and operate the SPB 108, and thus steps performed and messages sent/received in FIG. 2a could also be conducted by the PP 101 (where the PP 101 could use the SPB 108 in order to perform some steps and send/receive some messages as depicted in FIG. 2a). The operation of a PP 101 with an SPB 108 with hardware components is also depicted and described in connection with FIG. 1b above.

Configuration package 107 could use the data recorded with a configuration package 107 as depicted in FIG. 1a to establish a secure session 203 with configuration server 201, including using (i) the identity ID.SPB-CS 201i to locate CS 201 on the IP network 105, (ii) the certificate Cert.SPB-CS 201c to authenticate CS 201 in the secure session 203, and (iii) TLS parameters 107k. The configuration package 107 and CS 201 could establish the authenticated and encrypted secure session 203 using the certificate Cert. SPB-CS 201c. The configuration package 107 could use libraries and drivers within PP 101 and device 102 in order to send and receive data through physical interface 102a. In exemplary embodiments, the secure session 203 could comprise a TLS v1.3 session such as that specified in IETF RFC 8446, and other possibilities exist as well for the format and data used to establish the secure session 203 without departing from the scope of the present disclosure. Note that configuration package 107 and/or uSPB 108 could include a secure session library equivalent to the secure session library 102y for device 102 depicted and described above in connection with FIG. 1a. Or, the secure session library could be included with the SPB OS 108h, where SPB OS 108h is depicted in FIG. 1a. In exemplary embodiments, SPB OS 108h can operate both the configuration package 107 to conduct a configuration of SPB 108 and then also operate the configured SPB 108' after completion of the configuration. In other words, and unconfigured SPB 108 operating in PP 101 could conduct the steps of configuration package 107, where configuration package 107 can be included with uSPB 108 in a downloaded firmware 106.

After the setup of secure session 203, the configuration package 107 or unconfigured SPB 108 can query the primary platform 101 for supported cryptographic parameters 111a' used by primary platform 101 in a message 204. Configuration package 107 could query PP 101 using a memory interface or a system call, such that PP 101 responds with configuration data such as supported cryptographic parameters 111a' based on data processed through the memory interface or the system call. PP 101 could respond to the query in message 204 with a response message 205. The response message 205 from PP 101 to the configuration package 107 could include the supported parameters 111a' for PP 101 available to configuration package 107, a set of primary platform configuration data 101a, and a first random number random1 202c. The PP 101 could generate the random1 202c before or after the receipt of message 204 using a random number generator 128 depicted in FIG. 1b. In exemplary embodiments random1 202c can comprise a number with sufficient length and information entropy to be reasonably unique in a system 100 or system 200a with millions or more devices, such as a random number with a length of 128 or 256 bits, and other possibilities exist as well.

The PP configuration data 101a could include data for configuration package 107 or CS 201 to determine the capabilities of PP 101, such as available memory for SPB 108', an operating firmware version for PP 101, information for device 102 such as a device identity, the manufacturer of TRE 113 operating PP 101, and other possibilities exist as well. In some exemplary embodiments, PP configuration data 101a includes specifying a type of support for PP 101 of collecting biometric data from a user of device 102 through a user interface 102j, such as a fingerprint or facial recognition. PP configuration data 101a could also specify support for user input verification in addition to or other than biometric user biometric data such as the input of a personal identity number (PIN) through a user interface 102j for device 102.

Configuration package 107 or unconfigured SPB 108 can then conduct a step 206 to process the data from PP 101 in message 205. A step 206 can include configuration package 107 or uSPB 108 selecting the matching cryptographic parameters 111a" ' supported by both PP 101 and SPB 108. Exemplary matching cryptographic parameters 111a"' were also depicted and described in connection with FIG. 1c above. A step 206 can include configuration package 107 or uSPB 108 processing PP configuration data 101a, such as confirming support for the operation of a configured SPB 108' and sufficient memory for an SPB 108'. In exemplary embodiments, SPB 108' can utilize a first Java version, and PP 101 can utilize a second Java version, and the configuration package 107 can determine the first and second Java versions are compatible in the step 206.

PP configuration data 101a could also include a level of security or authorization that PP 101 would provide to SPB 108', such as exemplary levels of "high", "medium", etc. and configuration package 107 could relay that level to CS 201. In exemplary embodiments, a step 206 could include configuration package 107 selecting a type of user authentication 206a of device 102 to support for the SPB 108' from the PP configuration data 101a such as (i) biometric—facial, (ii) biometric—fingerprint, (iii) PIN entry, and other possibilities exist as well. The supported user authentication 206a of device 102 could also be included in PP configuration data 101a, which is also sent to a configuration server 201 in a subsequent message 207.

Configuration package 107 or unconfigured SPB 108 can then send CS 201 a message 207 through the secure session 203, where the message 207 can include the matching cryptographic parameters 111a''', the PP configuration data 101a, and the first random number random1 202c. Configuration server 201 can receive and process the message 207 in steps 210 and 211. In a step 210, CS 201 can select an operating set of cryptographic parameters 111a'''-x from the set of matching cryptographic parameters 111a'''. The exemplary selection of an operating set of cryptographic parameters 111a'''-x from a matching set of cryptographic parameters 111a''' is also depicted and described in connection with FIG. 1c above. The operating set of cryptographic parameters 111a" '-x from a matching set of cryptographic parameters 111a"' can specify the supported parameter for PP 101 to use for processing digital signatures 215a and 237a below. CS 201 could also use the PP configuration data 101a to select the operating set of cryptographic parameters 111a'''-x from a matching set of cryptographic parameters 111a''', such as if multiple sets of cryptographic parameters 111a''' are supported.

In a step 210, CS 201 could also select a second set of parameters 210b from the supported SPB parameters 111a" for SPB 108 to use in order to generate a PKI key pair. In other words, the selected operating set of cryptographic parameters 111a'''-x can be used by PP 101 for the processing of subsequent digital signatures 215a and 237a, while the parameters used by a subsequent PKI key pair by SPB 108 in a step 213 could use a different set of parameters 210b. The selection of the parameters 210b by CS 201 in a step 210 is also depicted for the parameters 111 in FIG. 1b. CS 201 could select the second set of parameters 210b based on the supported application of SPB 108, the parameters 111a" or the security requirements for SPB 108 (e.g. banking, identity, eSIM, etc.), which could be different than the supported security and algorithms of a manufactured and deployed PP 101 within device 102. Note that a message 207 could also include the set of parameters 111a" supported by SPB 108, and CS 102 could also select the parameters 210b from the received set of parameters 111a".

CS 201 can use a preference list for supported cryptographic parameters of SPB 108' in order to select the operating set of cryptographic parameters from the matching set. In this manner and through the selection of the operating set of cryptographic parameters by CS 201, the server can specify the preferred parameters for configuration of SPB 108. The preferred parameters may change over time or for different circumstances of device 102 (such as a first preference list for a device with "high" security requirements and a second preference list for a device with "medium" security requirements). The firmware 106 for PP 101 with SPB 108 may be created years before loading of SPB 108, and a configuration server could select the most preferred parameters at the time of configuration, instead of forcing the selection at the time the firmware 106 was created.

At step 211, CS 201 can generate a second random number random2 211a, which can subsequently be used by device 102 and PP 101 to authenticate subsequent data received from PP 101. Note that the use of a first random number random1 202c and the second random number random2 211a can be useful for the transfer of authenticated data between PP 101 and CS 201, since the secure session 203 can be between SPB 108 and CS 201. In other words, CS 201 may not communicate directly with PP 101 in a system 200a and system 100 (e.g. secure session 203 can be with uSPB 108), and thus additional random numbers and authentication steps outside of secure session 203 can be required in order to ensure that data between PP 101 and CS 201 can be transferred in a fully authenticated manner.

Configuration server 201 can then send configuration package 107 or uSPB 108 a message 212 through secure session 203, where the message 212 can include the selected operating cryptographic parameters 111a'''-x and the second random number random2 211a. Configuration package 107 or uSPB 108 can receive and process the message 212. Configuration package 107 or uSPB 108 can then conduct a step 213 to generate a private key SK.SPB 213a using the selected operating cryptographic parameters 111a" '-x. For example, the parameters 111a'''-x could specify a type 111c (as depicted and described in FIG. 1c above) which could specify the key length for SK.SPB 213a. Configuration package 107 or uSPB 108 can receive the message 212 and process the message In exemplary embodiments, the cryptographic algorithms for the generation of PKI keys could be included in the SPB OS 108h within firmware 106. In other words, the set of SPB 108 cryptographic parameters 111a" could specify the cryptographic algorithms supported by SPB OS 108h. Configuration package 107 or uSPB 108 in a step 213 could then generate a public key PK. SPB 213b using the derived SK.SPB 213a and the second set of parameters 210b within supported parameters 111a" supporting cryptographic algorithms within SPB OS 108h. In exemplary embodiments, SPB 108 can use a random number generator 128 within PP 101 for the derived SK.SPB 213a. In addition, SPB 108 could use random1 202c and random2 211a in addition to a random number from PP 101 in order to generate the secret key SK.SPB 213a. For ECC algorithms, the private key can be a random number and the public key could be obtained by multiplying a base point G (specified by a named curve for the type 111c) by the private key. For PQC algorithms, a random number from PP 101 could be input into a "Keygen" function for the PQC algorithm, such as the Keygen function for the Kyber and Dilithium PQC algorithms. Other possibilities exist as well for using standard methods for the generation of a PKI key pair by SPB 108 in a step 213 without departing from the scope of the present disclosure. Although FIG. 1c depicts the second set of parameters 210b for SPB 108 as different than the selected operating parameters 111a'''-x supported by PP 101, for some exemplary embodiments the values of the second set of parameters 210b and the selected operating parameters 111a'''-x could be the same (e.g. SPB 108 derived PKI key pair could be supported by cryptographic algorithms 141 within PP 101).

Note that for some embodiments, the parameters 111 used the generation of PKI keys in a step 213 could use a value within supported SPB parameters 111a" and the private key SK.SPB 213a and public key PK.SPB 213b are not required to be natively or directly supported by the primary platform parameters 111a'. In other words, parameters 210b supported by SPB 108 may not be included or supported by cryptographic algorithms 141 for PP 101. However, subsequent digital signatures over PK.SPB 213b can preferably support the operating parameters 111a'''-x, such that primary platform 101 can process and verify the digital signatures (such as signature 215a below), as well as generate a digital signature by PP 101 for the PK.SPB 213b (such as digital signature 237a below). In this manner, SPB 108' can securely use and operate with a PKI key pair for cryptographic algorithms in SPB OS 108h that are not supported by cryptographic algorithms 141 used by PP 101 (depicted in FIG. 1b above). In this manner, the flexibility of a system 200a can be increased, and firmware 106 for SPB 108' deployed with updated cryptographic algorithms in SPB OS 108h that were not initially used by PP 101 when PP 101 and the associated TRE 113 were manufactured.

Configuration package 107 or uSPB 108 can then send CS 201 a message 214 through the secure session 203, where the message 214 can include the derived secondary platform bundle public key PK.SPB 213b. Configuration server 201 could receive the message 214 and conduct a series of steps in order to authenticate the public key PK.SPB 213b for submission by uSPB 108 or configuration package 107 to PP 101. In a step 215, CS 201 could generate a digital signature 215a using private key 201p which corresponds to the public key 201ca in the certificate for CS 201 of Cert. SPB-CS 201c. The digital signature 215a could be over data that includes the secondary platform bundle public key PK.SPB 213b, the first random number random1 202c, and the second random number random2 211a. For some embodiments, the inclusion of random2 211a could be omitted from the first digital signature 215a. When using ECC or RSA based algorithms, the generation of digital signature 215a in a step 215 could utilize the steps and methods specified by the Federal Information Processing Standards publication FIPS PUB 186-4, which is herein incorporated by reference. The depicted syntax in FIG. 2a of a digital signature such as digital signature 215a of "signature[x](y)" depicts that private key "x" is used to generate the signature over the data "y". Thus, the private key value of "x" is not transmitted in a message with the digital signature.

Different algorithms as specified by parameters 111a'''-x could be used for generation of digital signature 215a in a step 215, such as those supporting PKI keys and digital signatures for post-quantum cryptography, including algorithms based on code-based algorithms, lattice-based algorithms, or multivariate based algorithms. A post-quantum cryptography algorithm in a step 215 (and subsequent steps in systems 200a and 200b below for signature verification and generation) could also support the signature algorithms specified in "Round Two" of the Post-Quantum Cryptography Standardization project from the National Institute of Standards (MST), which is summarized in the Wikipedia article from Oct. 23, 2019 titled "Post-Quantum Cryptography Standardization" which is herein incorporated by reference. The selection of the algorithm and supporting parameters to use in a step 215 could be specified in the selected operating parameters 111a'''-x from a step 210, which are also illustrated in FIG. 1c. For some embodiments, the digital signature 215a could use the selected operating parameters 111a'''-x, while the SPB public key PK.SPB 213b could use a different set of parameters 210b from the supported SPB parameters 111a" and also selected in a step 210.

At step 216, configuration server 201 can select or query for a certificate chain Cert.chain.SPB-CS 201e for the certificate of configuration server 201 through the primary platform root certificate Cert-root CA 133 specified in the selected operating parameters 111a'''-x, which are also illustrated in FIG. 1c. For some embodiments, in a step 216 CS 201 could select a certificate chain through a different primary platform certificate than a root certificate, such as if both CS 201 and PP 101 record the same intermediate parent certificate for both primary platform certificate Cert.PP 120 and configuration server certificate Cert.SPB-CS 201c, which could also be specified in the selected operating parameters 111a'''-x.

At step 217, configuration server 201 could conduct an Online Certificate Status Protocol (OCSP) stapling request for each of the intermediate and parent certificates in the selected certificate chain Cert.chain.SPB-CS 201d. In step 217, configuration server 201 could conduct the steps specified in IETF RFC 6961 in order to obtain a current certificate status for each of the intermediate and parent certificates in the selected certificate chain Cert.chain.SPB-CS 201d. Other possibilities for obtaining or querying for the certificate status for each of the intermediate and parent certificates in the selected certificate chain Cert.chain.SPB-CS 201d are possible as well in a step 217 without departing from the scope of the present disclosure. The resulting OCSP stapling or certificate status from a step 217 could comprise an OCSP stapling 217a. In preferred embodiments, the parameters for each of the intermediate and parent certificates in the selected certificate chain Cert.chain.SPB-CS 201d can support the selected operating parameters 111a'''-x, such that CS 201 and PP 101 can mutually support the parameters required to verify certificate status in OCSP stapling 217a.

At step 218, configuration server 201 could obtain a current date and time value of time 218a. CS 201 could submit a request for time 218a and the first random number random1 202c from PP 101 in message 207 to the timestamp authority (TSA) with a TSA certificate 111g specified in the selected operating parameters 111a'''-x. The TSA for TSA certificate 111g could respond with a digital signature 218b over the random number random1 202c and the date and time value 218a. The signed timestamp of 218b over the random number random1 202c and the date and time value 218a can be useful for PP 101 to acquire a verified current time since PP 101 generated the value random1 202c in a step 202. The signed and later verified value of signed timestamp 218b can support verifying the time values in OCSP stapling 217a, in order to determine that all required certificates for verification of Cert. SPB-CS 201c are valid at the current time of 218a. Note that the time 218a used by PP 101 and CS 201 does not need to be precise within a level of seconds, but security for a system 200a could be sufficiently maintained with a time value of 218a accurate to within (or processed within) a range of an exemplary several hours or less.

Configuration server 201 can then send configuration package or uSPB 108 a message 219 through secure session 203. The message 219 can include (i) the digital signature 215a using SK. SPB-CS 201p over at least random1 202c, the derived public key for SPB 108 of PK.SPB 213b, and random2 211a, (ii) the values for random1 202c, the derived public key for SPB 108 of PK.SPB 213b, and random2 211a, (iii) the configuration server certificate Cert.SPB-CS 201c, (iv) the intermediate and parent certificates in the selected certificate chain Cert.chain.SPB-CS 201d, (v) the certificate status for each of the intermediate and parent certificates in the selected certificate chain Cert.chain.SPB-CS 201d as OCSP stapling 217a, (vi) the time value 218a, and (vii) the signed timestamp 218b from the timestamp authority over the time value 218a and the first random number random1 202c. Although not depicted in FIG. 2a, the digital signature 215a from a step 215 could also be over the selected set of operating parameter 111a'''-x.

The configuration package 107 or unconfigured SPB 108 can receive message 219 and perform a step 220 in order to process the message. SPB 108 can use the selected operating cryptographic parameters 111a'''-x to verify digital signature 215a using configuration server certificate Cert. SPB-CS 201c. The configuration package 107 or unconfigured SPB 108 could receive the values signed in digital signature 215a of random1 202c, random2 211a. SPB 108 could either receive PK. SPB 213b in a message 219 or store the public key from a step 213 above (and thus PK. SPB 213b could be omitted from message 219). In other words, SPB 108 could receive, generate, or store the data used by CS 201 to generate digital signature 215a. A step 220 could also comprise the verification of OCSP stapling 217a using certificate chain Cert.chain.SPB-CS 201d as well as the verification of signed timestamp 218b. For some exemplary embodiments, in a step 220, configuration package 107 or unconfigured SPB 108 could omit verification of digital signature 215a, signed timestamp 218b, and/or OCSP stapling 217a and pass the values to PP 101 and CPU 113b using an internal bus for TRE 113.

The configuration package 107 or unconfigured SPB 108 can then send PP 101 a message 221, where message 221 can include (i) the digital signature 215a. As described above for a step 215a, configuration server 210 can generated digital signature 215a using SK.SPB-CS 201p over random1 202c, the derived public key for SPB 108 of PK.SPB 213b, and random2 211a. The message 221 can also include, in addition to (i) in the previous sentence, (ii) the values for random1 202c, the derived public key for SPB 108 of PK.SPB 213b, and random2 211a, (iii) the configuration server certificate Cert.SPB-CS 201c, (iv) the intermediate and parent certificates in the selected certificate chain Cert.chain.SPB-CS 201d, (v) the certificate status for each of the intermediate and parent certificates in the selected certificate chain Cert.chain.SPB-CS 201d as OCSP stapling 217a, (vi) the time value 218a, (vii) the signed timestamp 218b from the timestamp authority over the time value 218a and the first random number random1 202c, and (viii) the selected operating cryptographic parameters 111a'''-x. As depicted in FIG. 2a, the collection of steps and messages from a step 110 through a message 221 can comprise a step 222.

FIG. 2b

FIG. 2b is a simplified message flow diagram illustrating an exemplary system with exemplary data sent and received by (i) a device with a primary platform and unconfigured secondary platform bundle and (ii) a secondary platform bundle configuration server and the operation of a configured secondary platform bundle, in accordance with exemplary embodiments. System 200b can include a device 102 and a secondary platform bundle configuration server (SPB-CS) 201 communicating through an IP network 105. As contemplated herein, the secondary platform bundle configuration server (SPB-CS) 201 can also be referred to as configuration server 201. As depicted in FIG. 2b, device 102 and configuration server 201 could previously complete the series of steps and message flows depicted for a step 222 in FIG. 2a above, where a step 222 concludes with the receipt of a message 221 by primary platform 101.

After the receipt of a message 221, primary platform 101 can conduct a series of steps in order to process the data in message 221. At step 231, PP 101 can verify that cryptographic algorithms and parameters 111a' within PP 101 and TRE 113 support the selected set of operating cryptographic parameters 111a'''-x from a message 221. In a step 231, PP 101 can select the keys and certificates for primary platform parameters 111a' that support the selected set of operating cryptographic parameters 111a'''-x, where exemplary keys and certificates for parameters 111a'''-x are also depicted in FIG. 1c above. In a step 231, PP 101 can also confirm that the certificate for the configuration server Cert.SPB-CS 201c and the intermediate and parent certificates in Cert.chain. SPB-CS 201d also support the selected set of operating cryptographic parameters 111a'''-x. Note that in some exemplary embodiments, the received SPB public key PK.SPB 213b does not need to support the selected set of operating cryptographic parameters 111a'''-x and rather could be compatible with a set of parameters 210b for the SPB parameters 111a''. In a step 232, PP 101 could also verify that the intermediate and parent certificates in Cert.chain.SPB-CS 201d terminate with a certificate authority certificate or root certificate previously stored in PP 101, such as with a certificate Cert-root.CA 133 that also support parameters 111a'''-x.

In step 233, PP 101 can verify the received configuration server certificate Cert.SPB-CS 201c through the intermediate and parent certificates in the certificate chain Cert.chain. SPB-CS 201d up through the previously stored Cert-root.CA 133 by PP 101. In this manner, PP 101 can trust the received configuration server certificate Cert.SPB-CS 201c. In step 234, PP 101 can verify the signed timestamp 218b for the time value 218a using the timestamp authority certificate 111g. Note that in exemplary embodiments, the signed timestamp 218b is also over the random number random1 202c which a PP 101 could previously generate in a step 202. In this manner, PP 101 can trust that time value 218a is reasonably current, as opposed to a cached or an old value for time. In other words, a PP 101 may not have sufficient resources to track time when powered off, and thus PP 101 can require a signed timestamp 218b value over both (i) a random number such as random1 202c generated by PP 101 relatively recently, such as in the data flows depicted in a step 222 in FIG. 2a and (ii) a timestamp value 218a. After verifying the signed timestamp 218b using the time value 218a and timestamp authority certificate 111g, PP 101 could also verify that the received certificates from a message 221 are also valid and have not been expired. Note that without a valid or trusted timestamp value such as timestamp 218a, PP 101 may not be able to determine if received certificates such as Cert. SPB-CS 201c have expired.

In a step 235, PP 101 can verify OCSP stapling 217a (or equivalently a current certificate status) for the received configuration server certificate Cert.SPB-CS 201c as well as the intermediate and parent certificates in the certificate chain Cert.chain.SPB-CS 201d. A step 235 can also include using the verified time value 218a from a step 234 to confirm that the received OCSP stapling 217a data is current and the OCSP stapling 217a values can be trusted. In other words, the OCSP stapling 217a values for certificates received in a message 221 can have time ranges for validity of the OCSP stapling 217a, and PP 101 can confirm in a step 235 the verified time value 218a is within the time range for validity of the OCSP stapling 217a.

In a step 236, PP 101 can verify the digital signature 215a for at least the secondary platform bundle public key PK.SPB 213b using the received certificate for the configuration server 201 of Cert. SPB-CS 201c. In other words, the certificate for configuration server of Cert.SPB-CS 201c can include a public key PK. SPB-CS 201ca, and PP 101 can use the public key PK. SPB-CS 201ca and operating set of cryptographic parameters 111a'''-x to verify the digital signature 215a. PP 101 could input the same data into the digital signature verification step as used by CS 201 in the digital signature generation step of PK.SPB 213b, random1 202c and random2 211a. In exemplary embodiments, the inclusion of random1 202c from PP 101 in the generation and verification of digital signature 215a can be helpful for preventing replay attacks. PP 101 can store the value random1 202c generated in a step 202 and confirm that (i) the received value random1 202c and input into verification of digital signature 215a is the same as (ii) the stored value for random1 202c from a step 202. Without generation and use of random1 202c by PP 101, the data in request 221 from configuration package 107 could be fraudulent or replayed based on data from a different SPB 108 possibly in a different device.

Note that the certificate for the configuration server can be previously established as trusted through the previous steps of 232 through 235 to verify (i) Cert. SPB-CS 201c, (ii) the certificate chain for Cert. SPB-CS 201c of Cert.chain. SPB-CS 201d, (iii) OCSP stapling 217a, and the timestamp 218b for time value 218a. In exemplary embodiments, digital signature 215a can also be over random1 202c and random2 211a, although use of either random number could be omitted for some embodiments. Note that PP 101 can use the selected operating set of cryptographic parameters 111a'''-x from message 221 in order to conduct steps 231 through 237. The verification of digital signature 215a can confirm to PP 101 that (i) the received value of PK.SPB 213b can be trusted and (ii) through the generation and use of random1 202c by PP 101 that the digital signature 215a and associated PK. SPB 213b have not be "replayed" or generated for a different device 102. Consequently PP 101 could (i) subsequently generate a digital signature for the SPB public key of PK.SPB 213b and (ii) transfer the primary platform certificate Cert.PP 120 to the uSPB 108.

In a step 237, PP 101 can select the primary platform secret key SK.PP 115a for the operating parameters 111a'''-x. PP 101 can generate a digital signature 237a using SK.PP 115a over the secondary platform bundle public key PK.SPB 213b and the random number random2 211a generated by the configuration server 201 in a step 211. The use of a signature by primary platform 101 over the secondary platform bundle public key PK. SPB 213b and random2 211a can be useful for a configuration server 201 to securely know that SPB 108 is operating on the PP 101, such that configuration server 201 can subsequently generate a certificate for SPB 108'. In other words, without a digital signature 217a by PP 101 using SK.PP 115a, configuration server 201 may not securely know or determine which PP 101 is associated with the PK. SPB 213b. Other systems and networks (such as a network 250 described below) may subsequently rely upon a certificate for SPB 108', and the certificate for SPB 108' can be securely trusted by confirming via digital signature 237a that SPB 108' operates within the specific PP 101 recording the SK.PP 115a.

PP 101 can then send the configuration package 107 or unconfigured SPB 108 a message 238, where message 238 can include (i) the digital signature 237a over the SPB public key PK.SPB 213b and the random number random2 211a, (ii) a certificate for the primary platform public key to verify digital signature 237a, where the certificate can comprise Cert.PP 120, and (iii) a certificate chain of intermediate and parent certificates through a root certificate 133 of Cert.chain.PP 131. A message 238 could also include the random number random2 211a. Note the security of a system 200b can be increased by PP 101 only sending Cert.PP 120 in a message 238 after a digital signature 215a and all parent certificates for verification of the digital signature 215a have been verified. Thus, in exemplary embodiments, PP 101 can preferably only send a certificate for the primary platform 101 of Cert.PP 120 to configuration package 107 or uSPB 108 after verifying digital signature 215a and all parent certificates for the digital signature 215a, as well as OCSP stapling 217a and the signed timestamp 218b.

Configuration package 107 or unconfigured SPB 108 could receive the message 238 and process the message in a step 239. In a step 239, the digital signature 237a could be verified using the Cert.PP 120 for the SK.PP 115a, as well as verifying the intermediate and parent certificates in Cert.chain.PP 131 through a root certificate 133 for operating parameters 111a'''-x. Or, in some embodiments the full verification in a step 239 by configuration package 107 or unconfigured SPB 108 could be omitted and configuration package 107 or unconfigured SPB 108 could forward the data to configuration server 201 for verification. Note that OCSP stapling may not be available to PP 101 and OCSP stapling could be omitted from a message 238, but a configuration server 201 could subsequently query for the OCSP stapling to verify the Cert.PP 120 for the SK.PP 115a, as well as verifying the intermediate and parent certificates in Cert.chain.PP 131 in a later step, such as with a step 242. A step 239 could comprise the verification that all expected data in a message 238 was properly received and is properly formatted, such that the data could be successfully transmitted to a configuration server 201.

Configuration package 107 or unconfigured SPB 108 could send configuration server 201 a message 239a through secure session 203, where the message 239a can include (i) the digital signature 237a by PP 101 over (a) the SPB public key PK.SPB 213b and (b) the random number random2 211a, (ii) a certificate for the primary platform public key to verify digital signature 237a, where the certificate can comprise Cert.PP 120, and (iii) a certificate chain of intermediate and parent certificates through a root certificate 133 of Cert.chain.PP 131. Random number random2 211a could also be sent in a message 239a.

Configuration server 201 can receive the message 239a and conduct a series of steps in order to process the message. At step 240, CS 201 can also verify that the certificate for the primary platform Cert.PP 120 and the intermediate and parent certificates in Cert.chain.PP 131 support the selected set of operating cryptographic parameters 111a'''-x. In a step 240, CS 201 could also verify that the intermediate and parent certificates in Cert.chain.PP 131 terminate with a certificate authority certificate or root certificate previously stored in CS 201, such as with a certificate Cert-root.CA 133 that also support parameters 111a'''-x.

In step 241, CS 201 can verify the received PP certificate Cert.PP 201c through the intermediate and parent certificates in the certificate chain Cert.chain.PP 131 up through the previously stored Cert-root.CA 133 by CS 201. Or, in some embodiments the certificate chain 131 could terminate or be verified through a certificate stored in CS 201 that is not a root certificate. In this manner, CS 201 can trust the received primary platform certificate Cert.PP 120.

In a step 242, CS 201 can query certificate authority servers for current certificate status for Cert.PP 201 through the intermediate and parent certificates in the certificate chain Cert.chain.PP 131. Note that PP 101 may not be able to collect or generate OCSP stapling for the certificates, so CS 201 could determine current certificate status for all the certificates in a step 242. A step 242 could determine that all certificates for Cert.PP 201 through the intermediate and parent certificates in the certificate chain Cert.chain.PP 131 remain valid and have not been expired or revoked.

In a step 243, CS 201 can verify the digital signature 237a for at least the secondary platform bundle public key PK.SPB 213b using the received certificate for the primary platform 201 of Cert.PP 120. Note that the certificate for the primary platform can be previously established as trusted through the previous steps of 240 through 242 to verify (i) Cert.PP 120, (ii) the certificate chain for Cert.PP 120 of Cert.chain.PP 131, and (iii) the certificate status check for the certificates performed in a step 242. In exemplary embodiments, digital signature 237a can also be over at least random2 211a. The verification of digital signature 237a in a step 243 can confirm to CS 201 that the received value of secondary platform bundle public key of PK.SPB 213b can be authenticated as operating in SPB 108' within a PP 101, and consequently CS 201 could generate a certificate for the secondary platform bundle public key and SPB 108.

The use of random2 211a in a digital signature 237a can increase security, since PP 101 and SPB 108 must operate with the number random2 211a, which helps prevents the replay of previous values for a digital signature 237a. In other words, CS 201 can confirm that the digital signature 237a over PK.SPB 213b is uniquely and currently generated, since the digital signature 237a can also be over the number random2 211a. Although system 200a and system 200b depict the use of a random number for random1 202c and random2 211a, other values besides a purely random number could be used, such as security tokens, nonces, or challenges. The use of these alternatives to random numbers for random1 202c and random2 211a can achieve the same objectives of ensuring that nodes generating digital signatures use current data for the digital signature, where the current data is reasonably unique and also generated by node receiving and verifying a digital signature. In other words data for random1 202c may not be a random number, but rather data that is uniquely associated with PP 101 and preferably also unique for a step 202 and message 207. In some embodiments, the depicted numeral element 202c or 211a in FIGS. 2a and 2b could be a transaction IDs, hash values, or UUIDs.

At step 244, configuration server 201 can generate an identity for the secondary platform bundle of ID.SPB 108a as well as a certificate of Cert.SPB 108c, where the certificate of Cert.SPB 108c can include the secondary platform bundle public key PK.SPB 213b. The parameters for the secondary platform bundle public key PK.SPB 213b as specified in the certificate of Cert.SPB 108c can comprise the set of parameters 210b selected in a step 210 and also illustrated in FIG. 1c. The identity of ID.SPB 108a can comprise a unique identifier for the secondary platform to utilize, which could comprise a value such as an international mobile subscriber identity (IMSI), a subscriber permanent identity (SUPI), or a network access identifier (NAI) such as a NAI as specified in IETF RFC 7542 or a universal unique identifier (UUID). Other possibilities exist as well for the identity selected by configuration server 201 without departing from the scope of the present disclosure. Note that configuration server 201 could communicate with other servers, such as servers for a network 250 depicted in FIG. 2b in order to receive the identity value of ID.SPB 108a to assign to the configured secondary platform bundle 108'. In exemplary embodiments, the generated certificate of Cert. SPB 108c also includes the identity value of ID.SPB 108a.

For other embodiments, the SPB 108' can select the value of ID.SPB 108a and send the value of ID.SPB 108a in a message 239. For embodiments where configuration package 107 generates the value of ID.SPB 108a, then the request message 221 from configuration package 107 to PP 101 can include the ID.SPB 108a, and the PP 101 can generate the second digital signature 237a over both PK.SPB 213b and the ID.SPB 108a.

In a step 244, configuration server 201 could submit the value of ID.SPB 108a and PK.SPB 213b to a certificate issuer for the generation of a certificate Cert.SPB 108c. Configuration server 201 could (i) submit the value of ID.SPB 108a, PK.SPB 213b, and parameters 210b to a certificate issuer using a certificate signing request and (ii) receive the certificate Cert.SPB 108c. Configuration server 201 could also receive a list of intermediate and parent certificates for Cert.SPB 108c through a certificate authority root certificate 133, which could comprise Cert.chain.SPB 244a. The root certificate 133 for parameters 210b could be included in firmware 106 and uSPB 108, as received by device 102 in a message 154 in FIG. 1a.

At step 245, configuration server 201 could query or obtain certificate status for all the certificates in a Cert.chain. SPB 244a using OCSP, with a resulting set of OCSP stapling 245*a* for the certificate chain Cert.chain. SPB 244*a*. The steps to generate OCSP stapling 245*a* could be equivalent as those to generate OCSP stapling 217*a* for a step 217 in FIG. 2*a* above. At step 246, configuration server 201 could generate configuration data 246*a* for SPB 108. The generation of configuration data 246*a* for SPB 108 could also use the primary platform configuration data 101*a* received in a message 207.

The configuration data 246*a* could include parameters or values for a network 250 for SPB 108' to connect with, such as an identity for network 250 of ID.network 250*i*. The configuration data 246*a* could also include certificates for the network 250. In exemplary embodiments configuration data 246*a* can also include extensions or parameters for SPB 108 to use with secure sessions, such as with TLS or Datagram Transport Layer Security (DTLS) or IPSec or a virtual private network (VPN). For some embodiments, configuration data 246*a* for SPB 108' could include symmetric ciphering keys, network or server public keys, identities of servers, specification of parameters to use for networking, and other possibilities exist as well for configuration data 246*a*. Configuration data 246*a* could include settings or values for SPB 108' to operate as a bank or payment card, RFID card, hardware based identity for a user, and other possibilities exist as well for configuration data 246*a* without departing from the scope of the present disclosure.

A step 246 can also include configuration server 201 selecting a user authentication method 206*a*. The type of user authentication 206*a* of device 102 to support for the SPB 108' such as (i) biometric—facial, (ii) biometric—fingerprint, (iii) PIN entry, and other possibilities exist as well could be received in a PP configuration information 101*a* in a message 207 above. Other information or data for configuration data 246*a* generated or processed by a configuration server 201 in a step 246 are possible as well without departing from the scope of the present disclosure. For some embodiments, configuration data 246*a* can include a key K for an authentication and key agreement (AKA) protocol, such as 4G AKA or 5G AKA.

Configuration server 201 could then send configuration package 107 or unconfigured SPB 108 a message 247, where message 247 can include (i) the SPB identity value of ID.SPB 108*a*, (ii) the SPB certificate for the SPB public key of Cert.SPB 108*c*, (iii) the chain of intermediate and parent certificates for the SPB certificate of Cert.chain. SPB 244*a*, (iv) current certificate validity data which could comprise OCSP stapling 245*a* from a step 245, and (v) the SPB configuration data 246*a* from a step 246. The SPB configuration data 246*a* can also include (i) a selected user authentication method 206*a*, in order to specify the method for SPB 108' to utilize in order to authenticate a user of device 102 and (ii) network parameters of params.network 250*p* for SPB 108' to use when authenticating and/or establishing a secure session with a network 250. Note that message 247 could be transmitted via the secure session 203. Note that the selected parameters 210*b* for the SPB public key PK.SPB 213*b* could be included in the certificate for SPB of Cert. SPB. 108*c*.

Configuration package 107 or unconfigured SPB 108 could receive the message 247 and conduct a series of steps in order to process the message and complete a configuration of SPB 108. At step 248, configuration package 107 or unconfigured SPB 108 could verify Cert.SPB 108*c* records the selected parameters 210*b* and the generated SPB public key PK.SPB 213*b*. Step 248 can include the verification of the chain of intermediate and parent certificates for the SPB certificate of Cert.chain.SPB 244*a* through a root certificate Cert.root.CA 133 stored within SPB 108. At step 249*a*, configuration package 107 or unconfigured SPB 108 could verify the OCSP stapling 245*a* for the chain of intermediate and parent certificates for the SPB certificate of Cert.chain. SPB 244*a*. A step 249*a* could use the time value 218*a* received in a message 219 in order to fully verify OCSP stapling 245*a*, or a message 247 could also include an updated timestamp value and then a step 249*a* could use the updated time value from a message 247 instead of the time value 218*a* to fully verify OCSP stapling 245*a*.

Configuration package 107 or unconfigured SPB 108 can then conduct a step 249*b* to complete the configuration process and convert the unconfigured SPB 108 into a configured SPB 108'. A step 249*b* can include the loading and processing of the configuration data 246*a*, where configuration data 246*a* for SPB 108' were described above for a step 246. As one example, configuration data 246*a* can include an identity of a network 250 for SPB 108' to communicate with, such as ID.network 250*i*. Configuration data 246*a* could also specify timers, values, and settings for SPB 108' to use with a network 250 comprising network parameters of params.network 250*p*. For some embodiments, the network parameters of params.network 250*p* can include at least a certificate for a network 250 with ID.network 250*i*, where the certificate can support parameters 111*a*" as depicted and described in connection with FIG. 1*c* above.

The network parameters 250*p* can include extensions and settings for secure sessions such as TLS, DTLS, IPSec, and VPNs, such as supported symmetric ciphering algorithms, selected certificate authorities, in addition to a selected subset of parameters 111*a*" supported by SPB 108'. Configuration data 246*a* could include network preferences, roaming access parameters, Wi-Fi network identities such as secure set identifiers, and other possibilities exist as well. For some exemplary embodiments, configuration data 246*a* could include a selected set of parameters 111*a*" supported by SPB 108' to use when connecting with a network 250. A step 249*b* could also include SPB 108 loading the certificate Cert.SPB 108*c* and identity ID. SPB 108*a* into nonvolatile memory of TRE 113, such as NVM 113*s*.

Upon conclusion of a step 249*b*, configured SPB 108' could operate with the depicted values for an SPB 108' in FIG. 2*b* in order to communicate with a network 250. Or, for other embodiments the configured SPB 108' may be used to securely communicate with other local devices and not over an IP network 105, such as a local RFID reader or though a Bluetooth or Wi-Fi connection. Configured SPB 108' can include (i) an identity for SPB 108' to use such as ID. SPB 108*a* received in a message 247, (ii) the private key for SPB of SK.SPB 213*a* generated in a step 213, (iii) the certificate for SPB of Cert.SPB 108*c* received in a message 247, (iv) the intermediate and parent certificates through a root certificate of Cert.chain.SPB 244*a* received in a message 247, (v) a user authentication method 206*a* received in a message 247 or selected in a step 206, (vi) the parameters 210*b* (depicted in FIG. 1*c*) for the PKI keys of SPB 108' and received in a message 212, (vii) a network identity of ID.network 250*i* received in a message 247. Note that the configured SPB 108' could be stored by PP 101 in NVM 109*s* or 102*s* as a Ciphertext SPB 108\* as depicted in FIG. 1*b*. Thus, after the conclusion of a configuration step 249*b*, PP 101 could store the configured SPB 108' securely in general nonvolatile memory of device 102, and subsequently later load ciphertext SPB 108\* and decrypt with symmetric ciphering key 127 and store the SPB 108' in RANI 113e and launch or operate the SPB 108', such as after a boot of device 102 and a boot of TRE 113.

A configured SPB 108' can then conduct an authentication and/or establishment of a secure session 251 with a network 250. Some applications of an SPB App 108d may require only authentication, such generating a digital signature by SPB 108', but other applications of an SPB App 108d could require support for the full establishment of a secure session such as with 5G Extensible Authentication Protocol-Transport Layer Security (EAP-TLS) authentication, setup of a VPN, etc. Device 102 using PP 101 and SPB 108' can conduct an authentication and/or secure session setup with a network 250 using at least the SPB certificate Cert.SPB 108c, the network identity 250i, the selected cryptographic parameters 210b, and the network parameters params.network 250p. Note that params.network 250p could include a key K for an AKA protocol. An authentication or secure session 251 could also use the private key SK. SPB 213a generated in a step 213, where the private key SK. SPB 213a can correspond to the public key PK.SPB 213b in the SPB certificate Cert.SPB 108c. Note that the parameters specified by a SPB certificate Cert. SPB 108c can comprise the parameters 210b selected in a step 210 and received by uSPB 108 in a message 212.

CONCLUSION

Various exemplary embodiments have been described above. Those skilled in the art will understand, however, that changes and modifications may be made to those examples without departing from the scope of the claims.

The invention claimed is:

1. A wireless computing device comprising:
   a) at least one processor for a primary platform (PP);
   b) at least one computer-readable medium operatively connected to the at least one processor and having stored thereon instructions that, when executed by the at least one processor, cause the wireless device to perform a method for the PP to configure a secondary platform bundle (SPB), the method comprising:
   1) Recording (i) a first set of cryptographic parameters and (ii) a primary platform public key and a primary platform private key and (iii) a first certificate authority certificate;
   2) Receiving a ciphertext firmware comprising the secondary platform bundle;
   3) Deriving a first random number using a hardware random number generator;
   4) Establishing a secure session with a configuration server;
   5) Sending, to the configuration server, the first random number and the first set of cryptographic parameters;
   6) Receiving, from the configuration server, a subset of the first set of cryptographic parameters, a second set of cryptographic parameters, and a second random number;
   7) Deriving a SPB public key infrastructure (PKI) key pair comprising a SPB private key and a corresponding SPB public key using the second set of cryptographic parameters;
   8) Sending, to the configuration server, the derived SPB public key;
   9) Receiving, from the configuration server, a first digital signature over at least the SPB public key and the first random number, wherein the PP verifies the first digital signature using at least the subset and the first certificate authority certificate;
   10) Generating a second digital signature using the primary platform private key and the subset, wherein the second digital signature is over at least the SPB public key and the second random number;
   11) Sending, to the configuration server, the second digital signature;
   12) Receiving a SPB certificate and an identity for the SPB; and
   13) authenticating with a network using at least the SPB certificate and the identity.

2. The wireless computing device of claim 1, wherein the primary platform receives the first digital signature over the SPB public key and the first random number, along with a timestamp and a timestamp signature, and wherein the primary platform verifies the first digital signature using at least the subset of the first set of cryptographic parameters, the timestamp, and the first certificate authority certificate.

3. The wireless computing device of claim 1, wherein the primary platform establishes the secure session with the configuration server using one of (i) Datagram Transport Layer Security (DTLS) and (ii) Transport Layer Security (TLS).

4. The wireless computing device of claim 1, wherein the primary platform operates within a "system on a chip" (SOC) in a computing device with a general processor.

5. The wireless computing device of claim 4, wherein the primary platform records the primary platform private key in protected memory, and wherein the general processor cannot read and cannot write to the protected memory.

6. The wireless computing device of claim 1, wherein the SPB certificate includes the identity for the SPB.

7. The wireless computing device of claim 1, wherein the identity comprises one of (i) a subscription permanent identifier (SUFI) and (ii) a network access identifier (NAI).

8. The wireless computing device of claim 1, wherein the second set of cryptographic parameters specify lattice-based cryptographic algorithms for post-quantum cryptography.

9. The wireless computing device of claim 1, further comprising in step 13), authenticating with the network using at least the SPB private key.

10. The wireless computing device of claim 1, wherein the primary platform records a plurality of primary platform public keys and a plurality of corresponding primary platform private keys, and wherein the primary platform public key and the primary platform private key support the subset of the first set of cryptographic parameters.

11. The wireless computing device of claim 1, wherein the SPB certificate includes the SPB public key.

12. The wireless computing device of claim 1, further comprising in step 9), receiving the first digital signature with a configuration server certificate, wherein the PP verifies the first digital signature using at least the configuration server certificate, and wherein the PP verifies the configuration server certificate using at least the first certificate authority certificate.

13. The wireless computing device of claim 1, further comprising in step 12), receiving the SPB certificate and a second certificate authority certificate, wherein the PP verifies the SPB certificate using the second certificate authority certificate.

14. The wireless computing device of claim 1, wherein the PP includes a protected memory shared between the PP and SPB, and wherein the PP reads the SPB public key from the SPB using PP read instructions.

15. The wireless computing device of claim 1, further comprising in step 2), receiving the ciphertext firmware comprising the secondary platform bundle and a configuration package.

16. The wireless computing device of claim 15, wherein the PP operates the configuration package in order to conduct at least steps 3) through 8).

17. The wireless computing device of claim 1, further comprising in step 2), authenticating the secondary platform bundle using at least the first certificate authority certificate, wherein the secondary platform bundle comprises an unconfigured secondary platform bundle.

18. The wireless computing device of claim 1, further comprising in step 13), authenticating with the network using at least the SPB certificate, the identity, and the second set of cryptographic parameters.

19. The wireless computing device of claim 1, further comprising in step 11), sending, to the configuration server, a primary platform certificate with the primary platform public key, wherein the configuration server verifies the second digital signature using at least the primary platform public key.

20. The wireless computing device of claim 1, further comprising in step 12), receiving a SPB configuration, wherein the SPB configuration includes at least a network identity and network parameters, wherein the PP authenticates with the network using at least the network identity and the network parameters.

* * * * *